(12) United States Patent
Nelson

(10) Patent No.: US 10,743,728 B2
(45) Date of Patent: Aug. 18, 2020

(54) TOILET SYSTEM AND COMPONENTS THEREOF

(71) Applicant: TidyHut, Inc., Spokane, WA (US)

(72) Inventor: Erik Nelson, Spokane, WA (US)

(73) Assignee: TidyHut, Inc., Spokane, WA (US)

( * ) Notice: Subject to any disclaimer, the term of this patent is extended or adjusted under 35 U.S.C. 154(b) by 0 days.

(21) Appl. No.: 16/191,164

(22) Filed: Nov. 14, 2018

(65) Prior Publication Data

US 2019/0142231 A1 May 16, 2019

Related U.S. Application Data

(60) Provisional application No. 62/586,010, filed on Nov. 14, 2017.

(51) Int. Cl.
*A47K 11/02* (2006.01)
*E04H 1/12* (2006.01)

(52) U.S. Cl.
CPC .......... *A47K 11/02* (2013.01); *A47K 11/026* (2013.01); *E04H 1/1216* (2013.01)

(58) Field of Classification Search
CPC ............................. A47K 11/02; A47K 11/026
USPC ...................................................... 4/449, 476
See application file for complete search history.

(56) References Cited

U.S. PATENT DOCUMENTS

| | | | | |
|---|---|---|---|---|
| 181,397 A | * | 8/1876 | Beyron | |
| 2,628,879 A | * | 2/1953 | Schultz | A47B 79/00 312/235.5 |
| 3,665,522 A | * | 5/1972 | Backlund | A47K 11/026 4/484 |
| 3,693,193 A | | 9/1972 | May | |
| 4,519,104 A | * | 5/1985 | Nilsson | A47K 11/026 4/484 |
| 4,974,265 A | | 12/1990 | Maggio | |
| 5,379,466 A | * | 1/1995 | Davies | A47K 3/325 4/449 |
| 6,052,842 A | * | 4/2000 | He | A47K 11/026 4/484 |
| 6,145,931 A | * | 11/2000 | Subotic | A47C 7/506 297/188.11 |
| 6,827,035 B2 | * | 12/2004 | Manera | A01K 1/011 119/166 |
| 8,408,160 B1 | * | 4/2013 | Pozin | A01K 1/011 119/170 |
| 2015/0245748 A1 | * | 9/2015 | Banner | A47K 11/02 4/448 |

FOREIGN PATENT DOCUMENTS

DE 202011104936 12/2012
RU 02173949 9/2001

OTHER PUBLICATIONS

The PCT Search Report and Written Opinion dated Mar. 7, 2019, for PCT Application No. PCT/US2018/061105, 7 pages.

(Continued)

*Primary Examiner* — Huyen D Le
(74) *Attorney, Agent, or Firm* — Lee & Hayes, P.C.

(57) ABSTRACT

A toilet system includes a waterless waste disposal system. A waste liner advancement mechanism is configured to: cover a toilet seat with a liner, capture waste expelled from a user, and mechanically advance the liner into a waste storage area so as to place a fresh liner over the toilet seat after capturing the waste.

20 Claims, 15 Drawing Sheets

(56) References Cited

OTHER PUBLICATIONS

The Canadian Office Action dated Oct. 8, 2019, for Canadian Design Application No. 184616, a counterpart foreing application of Design U.S. Appl. No. 29/670,234, 2 pages

* cited by examiner

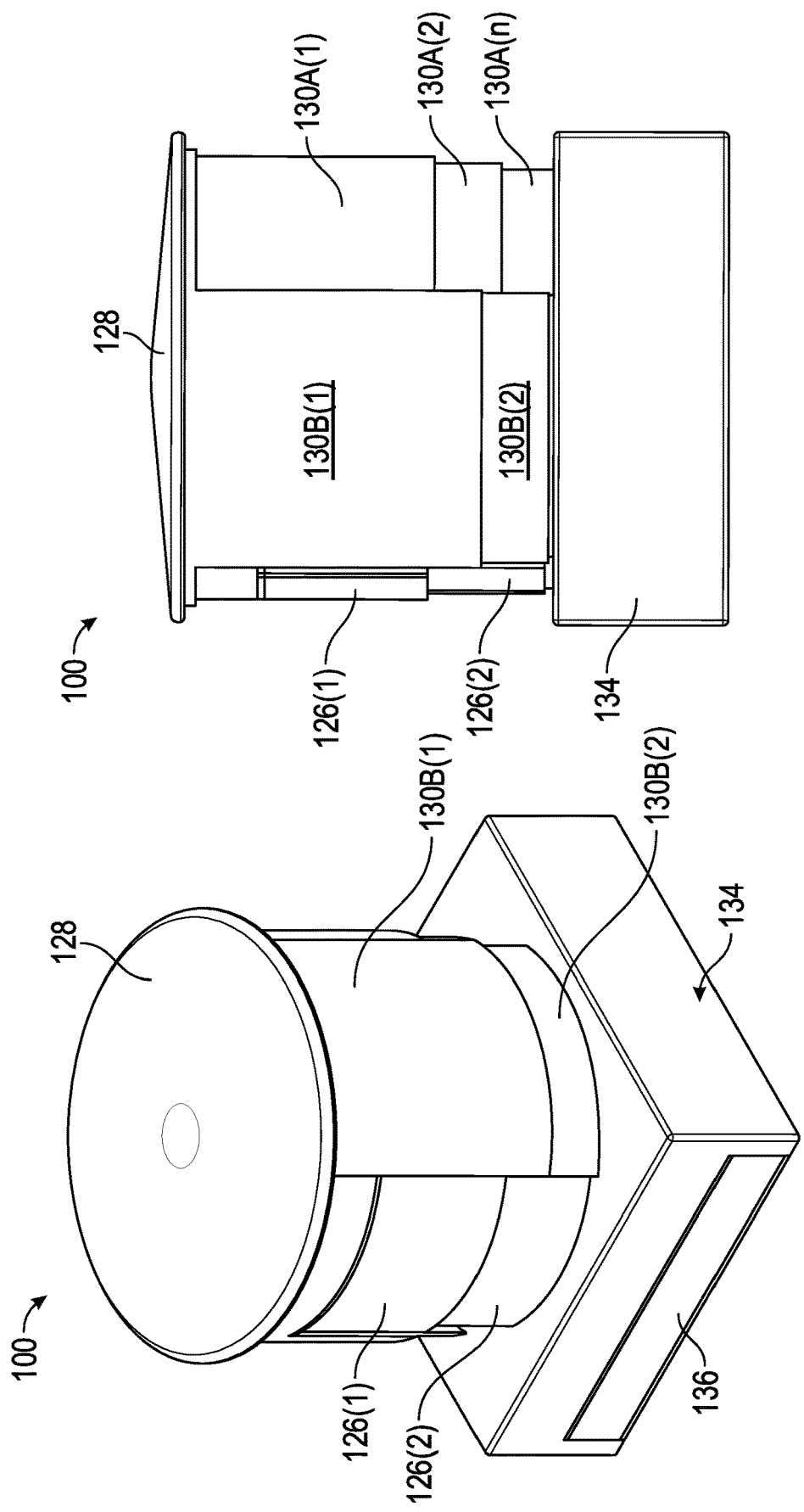

TOILET SYSTEM AND COMPONENTS THEREOF

CROSS REFERENCE TO RELATED PATENT APPLICATIONS

This application claims priority to U.S. Provisional Patent Application No. 62/586,010, filed on Nov. 14, 2017, entitled "Portable and/or Fixed Toilet System," and incorporates the content thereof in its entirety by reference.

BACKGROUND

Technical Field

The present disclosure relates to the technical field of sanitation with respect to the apparatuses and design features involved in human waste collection.

Description of the Related Art

The history of existing portable toilets traces back to their creation out of necessity in World War II shipyards. They were originally conceived due to time constraints for shipyard workers. Liberty ships and war ships were being built 24 hours a day with three full work shifts. It took too much precious time for a worker to climb down from a ship in dry dock, walk to and use a traditional flush toilet and then climb back up into the ship. Allegedly, an enterprising foreman, tired of work loss due to bathroom breaks, welded scrap metal together forming a bucket reservoir for workers to use. Later, walls and a door were added for privacy, as well as formaldehyde added to kill pathogens and to minimize the odor.

Today, despite portable toilets being manufactured primarily of plastic, portable toilets still strongly resemble the original models. With only minor improvements over the years, some examples of problems with current portable toilets include: an inability to eliminate or even mostly mask the foul smell, mountainous visible human waste under the toilet seat in the waste holding tank, difficulty in removing incompatible waste that is invariably thrown into the toilet by users, a general lack of sterilization for public use, etc.

Another related problem is that quantifiable usage metrics are difficult to track adequately in advance of the portable toilet being filled to or beyond a full load or maximum capacity. Thus, a situation may occur where a portable toilet sits at or beyond a full load capacity for an objectionable amount of time until a service provider is alerted and available to empty the waste holding tank. In some instances, this overfilled situation might be avoided by hiring a service provider to check and/or evacuate the waste on a predetermined regularly-recurring schedule. This type of schedule may be created based on historical averages for the length of time that it takes to fill a portable toilet in a particular location and environment during a particular time of year. While this type of recurring schedule may seem adequate, such a schedule may cause that the service provider is used too frequently, and thus unnecessarily costly to the entity providing or renting the portable toilets; or alternatively, the regular schedule may cause the service provider to be used too infrequently, which may end up being just as costly to resolve, and may also be problematic both for sanitation purposes and for user convenience and comfort.

Furthermore, the servicing of the chemicals frequently used in portable toilets generally requires an outside provider to use a large and expensive vacuum truck to suck out the contents and to pour in fresh water. This necessitates both a means for transporting noxious waste, as well as a distinct transportation means for the fresh water. Once evacuated, the waste must be transported to a suitable, sewer disposal area for treatment and processing.

In addition, the portable toilets are cumbersome to transport when moving new or used toilets to different locations. For starters, the liquid contents must be emptied. Further, the physical structure of current portable toilets has a fixed height to accommodate a variety of short and tall users. Accordingly, even though the primary functional purpose is focused on the toilet aspect, which is lower to the floor, the walls are tall for privacy purposes, which when not in use, essentially enclose a large amount of empty space. As a result of this large amount of enclosed empty space and rigid wall structure, when multiple toilets are transported for use in a location, the toilets are generally lined up standing next to each other, which results in inefficient vehicle use to transport empty space.

BRIEF DESCRIPTION OF THE DRAWINGS

The Detailed Description is set forth with reference to the accompanying figures. In the figures, the left-most digit(s) of a reference number identifies the figure in which the reference number first appears. The use of the same reference numbers in different figures indicates similar or identical items. Furthermore, the drawings may be considered as providing an approximate depiction of the relative sizes of the individual components within individual figures. However, the drawings are not to scale, and the relative sizes of the individual components, both within individual figures and between the different figures, may vary from what is depicted. In particular, some of the figures may depict components as a certain size or shape, while other figures may depict the same components on a larger scale or differently shaped for the sake of clarity.

FIG. 4 illustrates a perspective view of the toilet system in a collapsed position and/or stack and transport position according to an embodiment of the instant disclosure;

FIG. 5 illustrates a side view of the toilet system in the collapsed position and/or stack and transport position of FIG. 4 according to an embodiment of the instant disclosure;

DETAILED DESCRIPTION

Overview

This disclosure is directed to several aspects of a toilet system. Moreover, the present disclosure includes advances in multiple sanitation related areas including: toilets, privacy structures housing toilets, the portability of toilets, serviceability and service schedule of toilets, and sanitation conditions with respect to usage of the toilets. In particular, the features described herein are directly applicable for toilet facilities that range from public to private. For example, features of the disclosed subject matter may be implemented in facilities that are: free for general public use, such as in public parks; publicly accessible including public pay-per-use toilets in tourist locations, toilets reserved for authorized event patrons, etc.; remotely-located, such as in wilderness locations; fixed in permanent structures; portable including independent, free-standing movable structures that may be loaded into or on a mode of transport for removal, as well as incorporated into private or public vehicles such as RVs, buses, boats, trains, planes, etc. where standard, fixed modern plumbing is not readily available.

While the disclosure is directed primarily to toilet facilities that are not connected to modern plumbing, either due to lack of access to plumbing and/or sewage/disposal, or due to the temporary amount of time for which the toilet facility may be needed/desired in a location, it is contemplated that at least some of the features disclosed herein may be applicable to toilet facilities that are connected to modern plumbing as well. For instance, some of the features below may be implemented in hotels, event centers (e.g., sports arenas, stadiums, county fairs, etc.), factories, office buildings, shopping centers, etc.

As mentioned above, in some instances, the toilet system may be used in a portable embodiment, while in other instances, many of the concepts and features described herein may be applied to a non-portable, permanent or long-term placement toilet system. A toilet system according to the instant disclosure may include at least one of the features disclosed. Further, a toilet system implementing one or more of the features described according to the instant disclosure may provide one or more benefits, such as: improved sanitation; elimination or substantial masking of smells generally associated with human waste storage systems; improved portability of portable toilets by simplifying and enhancing transportation capabilities for a plurality of units via minimization of space needs to maximize space availability during transport; improved evacuation procedures and capabilities; minimization of costs associated with evacuation scheduling; improved safety; improved privacy; smart features; etc.

Illustrative Embodiments of a Toilet System

Figure 1:
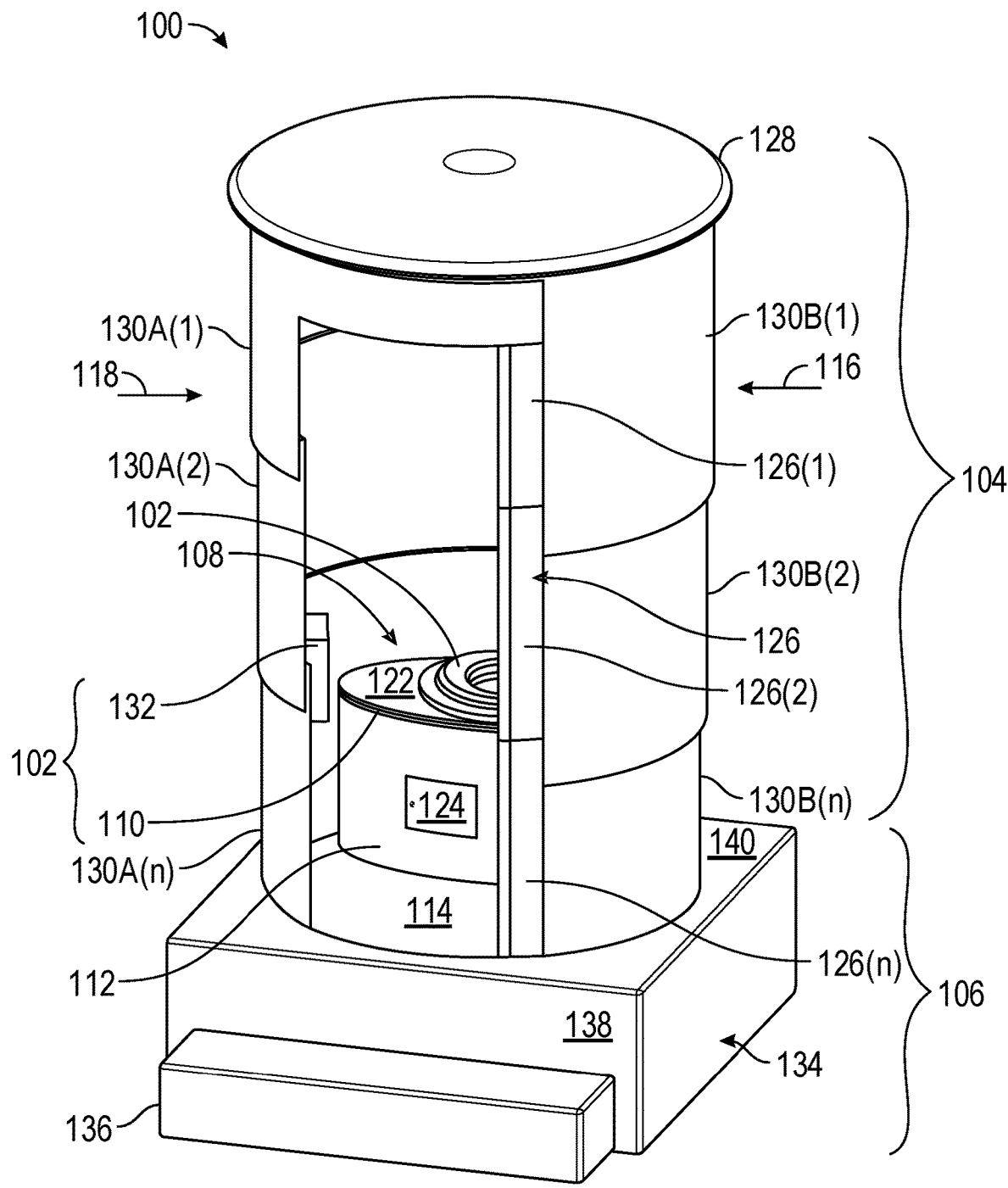
FIG. 1 illustrates a perspective view of a toilet system with the door open and the access step pulled out according to an embodiment of the instant disclosure.
Figure 2:
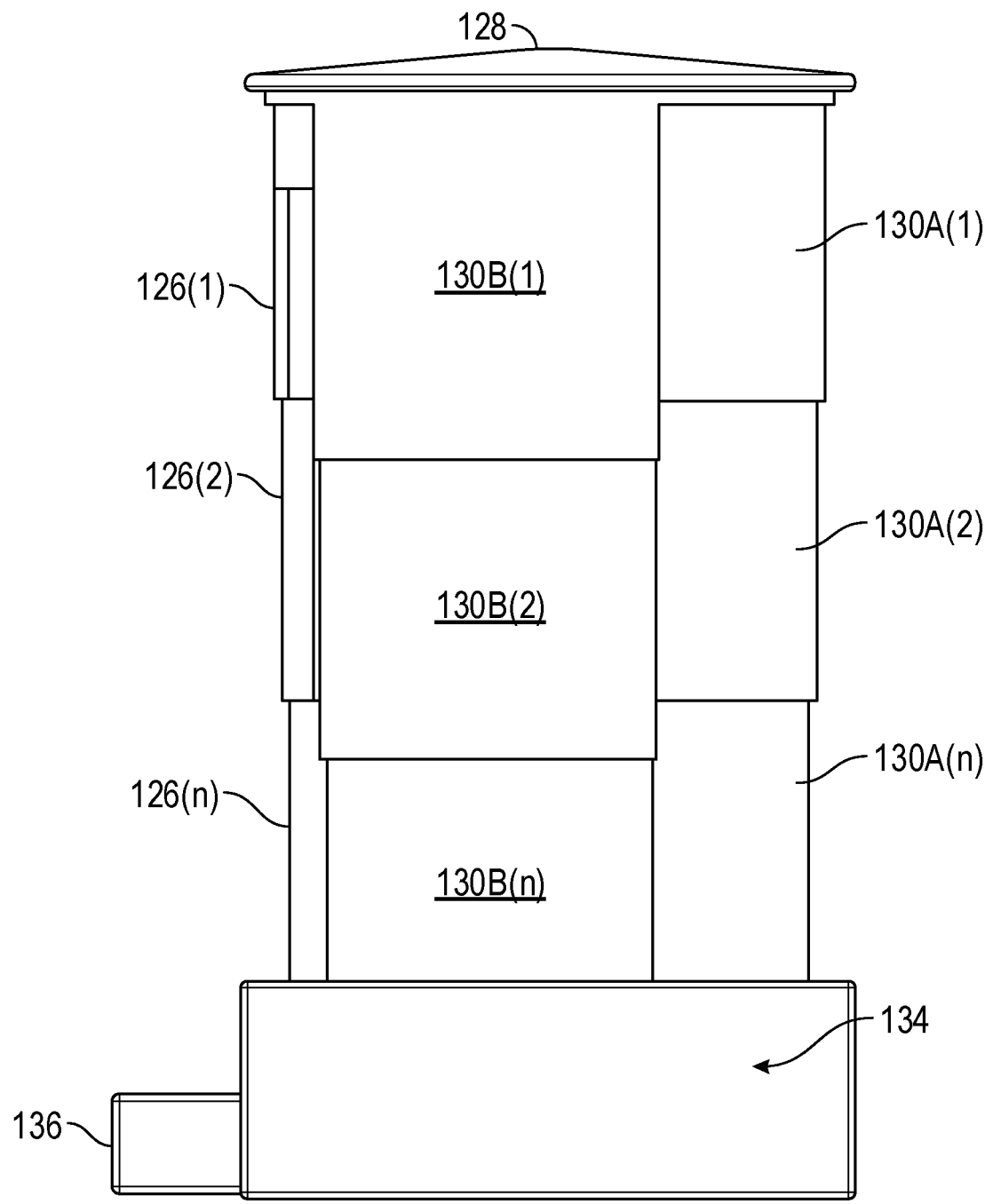
FIG. 2 illustrates a side view of the toilet system of FIG. 1 according to an embodiment of the instant disclosure.
Figure 3:
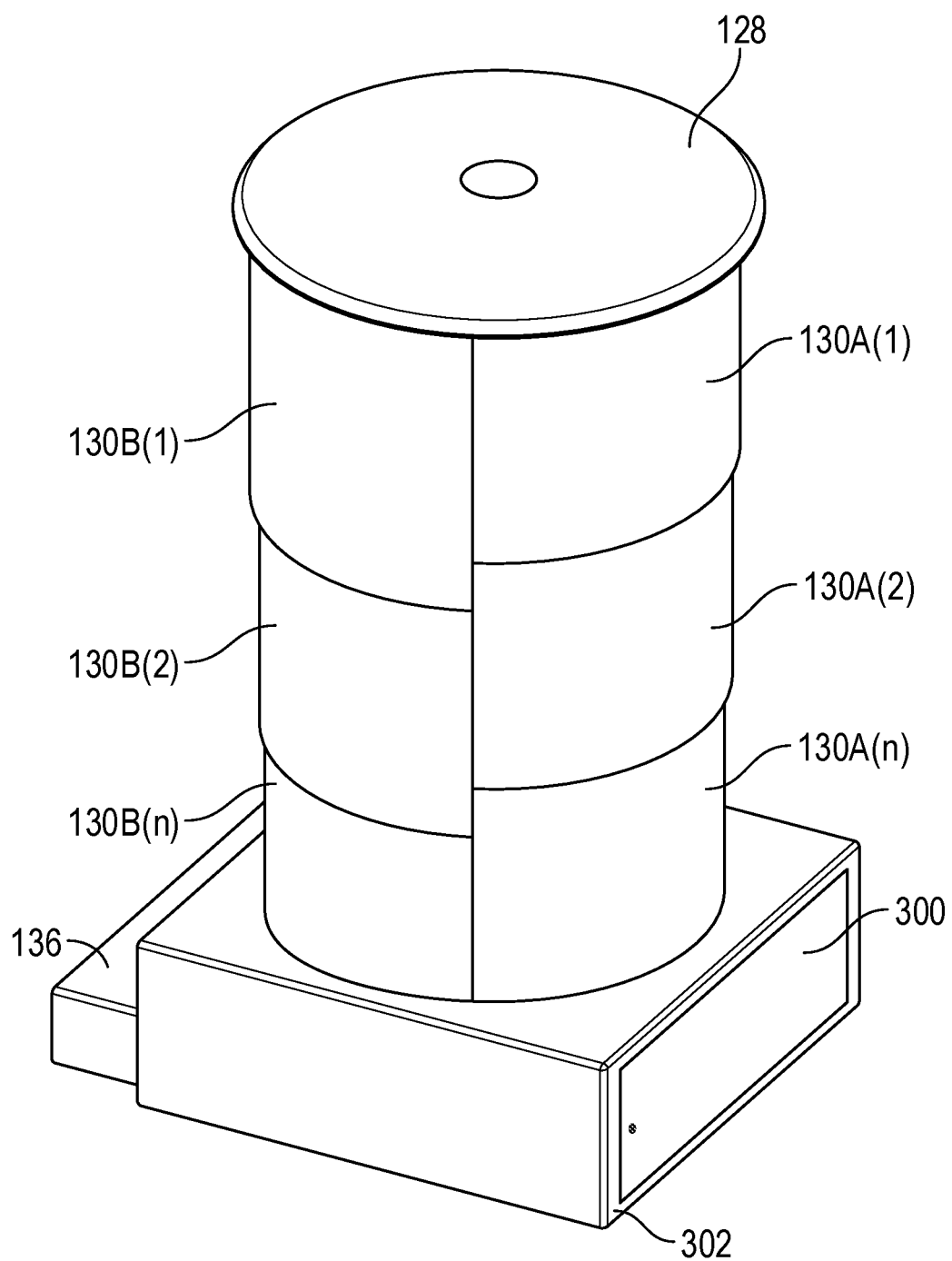
FIG. 3 illustrates a perspective view of the backside of the toilet system of FIG. 1 according to an embodiment of the instant disclosure.
Figure 6:
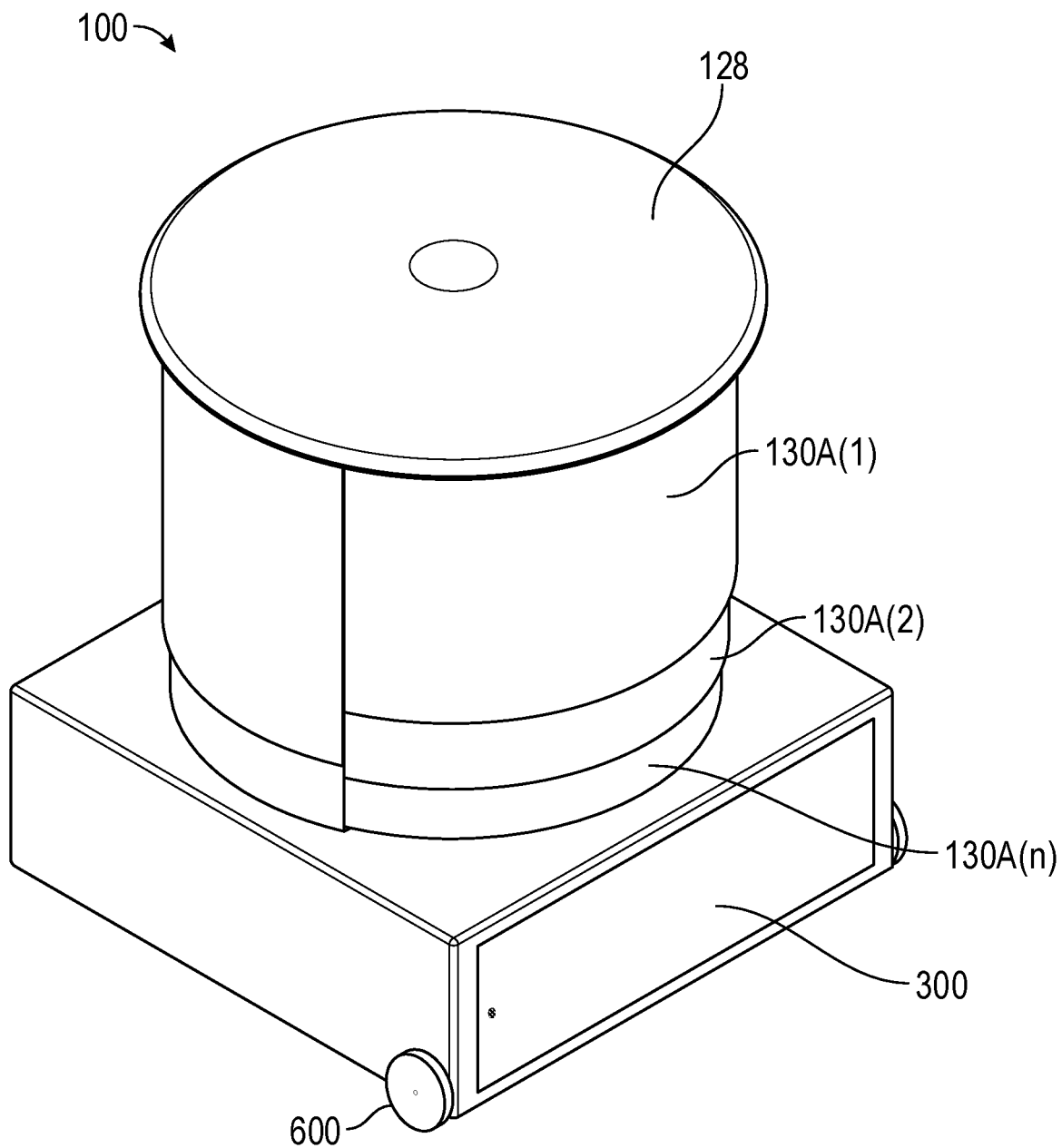
FIG. 6 illustrates a perspective view of the backside of the toilet system in the collapsed position and/or stack and transport position of FIG. 4 according to an embodiment of the instant disclosure.

Inasmuch as the features of a toilet system 100 are consistent between FIGS. 1-6, the features of toilet system 100 are described herein with respect to the various views depicted in FIGS. 1-6. Specifically, FIG. 1 depicts a front-right-side oriented, perspective view of toilet system 100 in a usable state; FIG. 2 depicts a planar right-side view of toilet system 100 in a usable state; FIG. 3 depicts a rear-right-side oriented, perspective view of toilet system 100 in a usable state; FIG. 4 depicts a front-right-side oriented, perspective view of toilet system 100 in a collapsed state; FIG. 5 depicts a planar right-side view of toilet system 100 in a collapsed state; and FIG. 6 depicts a rear-right-side oriented, perspective view of toilet system 100 in a collapsed state.

Toilet system 100 may be a portable, permanent, or long-term placement. That is, while toilet system 100, as depicted with the outer housing may be structured to be entirely portable, many, if not all, of the various features may be implemented in a system having a permanent outer structure, or a long-term placement in which the system may be implemented for a limited, yet undetermined length of time, during which the outer structure may be secured in a fixed manner (e.g., attached to a surface via a fastener) in order to deter theft and maximize stability in the event of adverse environmental conditions over a potentially long period of time.

In an embodiment, a toilet system 100 may include three main components: a waste disposal subsystem 102 to trap waste, an enclosure 104 for privacy while using the toilet, and a waste storage basin subsystem 106 to temporarily store the waste until the system is serviced. Each of these three components are discussed in detail herein below, and each of the components includes important subcomponents, which may be implemented alone, as well. Notably, each of the three components may be implemented all together to form a completely new toilet system as depicted, in a combination of any two components with or without further combining with one or more known components of a conventional toilet facility, or as a single component with or without further combining with one or more known components of a conventional toilet facility. For example, the waste disposal subsystem 102 may be implemented with a different shaped and/or conventional housing, with or without further combining waste storage basin subsystem 106. Additionally, and/or alternatively, enclosure 104 may be implemented with a conventional toilet seating system, thereby enhancing transportability. In still another embodiment, waste storage basin subsystem 106 may be added to a conventional portable toilet structure to facilitate waste storage, retrieval, and evacuation. Nevertheless, inasmuch as the three components are designed to also work together, the disclosure hereinafter discusses the components relative to each other in some instances, and it is contemplated that a system implementing the three components together may provide the greatest collective of benefits available.

Illustrative Embodiments of a Toilet Waste Disposal Subsystem

In an embodiment, toilet waste disposal subsystem 102 may include componentry that functions as a liner advancement mechanism (discussed in detail further herein) to completely cover the toilet seat with a fresh liner for each use and to remove waste (e.g., biological and non-biological waste, deposited either intentionally or unintentionally, including urine, feces, bacteria, viruses, skin cells, blood, vomit, saliva from spitting, miscellaneous non-biological matter or trash, etc.) from the toilet seat and the waste receptacle area (i.e., the toilet bowl). That is, after installing a disposable liner container and preparing the liner over the toilet seat (described further herein below), an action of an incoming user of the toilet facility causes the liner advancement mechanism to provide a fresh sanitary liner over the toilet seat and over the waste receptacle area such that any waste left on the toilet seat or within the waste receptacle area by the previous user is removed. In an embodiment, the waste may be removed into waste storage basin subsystem 106. Alternatively, in an embodiment where waste disposal subsystem 102 is incorporated into a conventional toilet system, the waste may simply be removed into a conventional waste holding area according to the particular toilet system.

The actuation of the liner advancement mechanism to replace the liner and for the removal of waste may be configured to occur automatically with a natural or necessary action of the user, such as opening the door to enter the toilet enclosure (discussed herein below). Alternatively, the actuation to replace the liner and for the removal of waste may be configured to occur by an additional manual action beyond merely opening the door. A non-limiting example of an additional manual action may include, after opening the door, a deliberate actuation of a hand or foot lever (not shown) to cause the liner advancement mechanism to refresh the liner, thereby removing the waste simultaneously. In essence, by implementing waste disposal subsystem 102 as described herein, the liner is intended to advance into waste storage basin subsystem 106 or conventional waste holding area with each use, thereby providing a more sanitary seating condition. Consequently, a user may feel more comfortable in using the toilet facility due to the improved sanitary condition and minimization of foul odors.

In an embodiment, waste disposal subsystem 102 may include a feature (e.g., mechanical componentry, electrical sensor, etc.) to disengage the liner advancement mechanism when a user is seated on the toilet seat so that the door may be opened without causing the liner advancement mechanism to advance the liner upon which the user is sitting (discussed in detail further herein). This feature may be useful, for example, in the event the user, perhaps a child or elderly individual, needs assistance while on the toilet. Further, the liner advancement mechanism may: block visibility of waste deposited by previous users, assist in masking the smell of previous waste deposited, encapsulate the waste from the user, prevent a user from falling into the waste, and facilitate easier removal of objects dropped accidentally into the waste receptacle area (e.g., phone, earring, wallet, keys, etc.).

In an embodiment, waste disposal subsystem 102 may further include a toilet seat basin 108 disposed inside enclosure 104. As depicted, toilet seat basin 108 may completely enclose the liner advancement mechanism to limit access thereto from within enclosure 104. The enclosed space of toilet seat basin 108 may be formed by a basin cover 110 and a panel wall 112, each of which abuts an interior wall portion of enclosure 104. As depicted, panel wall 112 may be positioned to extend, between basin cover 110 and a floor 114, substantially perpendicularly to the horizontal plane of basin cover 110, from a right side 116 (illustrated with directional arrow) of enclosure 104 to a left side 118 (illustrated with directional arrow) of enclosure 104. Note, for the sake of clarity, right side 116 and left side 118 are defined from the perspective of a user facing the entrance from outside enclosure 104. Alternatively, in an embodiment not depicted, toilet seat basin 108 may enclose less than shown, such as only covering the liner advancement mechanism, thereby leaving additional open space on floor 114 beneath basin cover 110 to the sides of the liner advancement mechanism.

Basin cover 110 is the upper support of toilet seat basin 108 and provides a firm base on which to attach a toilet seat 120. Basin cover 110 may further serve as an anchoring member for the liner advancement mechanism beneath toilet seat 120, as well as provide a shelf space 122, adjacent to toilet seat 120, on which a user may rest an object (if desired) while using toilet system 100.

Furthermore, in addition to protecting the liner advancement mechanism from tampering, the enclosed empty space within toilet seat basin 108 may serve as a storage for service and user consumable goods (not shown) including toilet paper, liner replacements, cleansers, hand soap, etc. Access to the inside of toilet seat basin 108 for replacing consumable goods or servicing the liner advancement mechanism may be possible through a panel opening. For example, the panel opening may be defined as an entirety of panel wall 112 being removable. Additionally, and/or alternatively, panel wall 112 may include a removable or displaceable portion 124, which may have a keyed/coded mechanism (not shown) to open the removable or displaceable portion 124 and permit access to the storage and/or the liner advancement mechanism.

In an embodiment, the area outside of toilet seat 120, including shelf space 122, may be slanted slightly forward and coated with a water-repelling agent. Thus, any liquid, such as urine, slides forward off of it and down into a channel at floor 114 that diverts the spillage either through a hole in enclosure 104 to the outside of toilet system 100 or into a different collecting chamber that may be embedded into a wall section of enclosure 104 or beneath basin cover 110.

Additional features of waste disposal subsystem 102 including the liner advancement mechanism are discussed later herein with respect to FIGS. 7-15, for example.

Illustrative Embodiments of an Enclosure

The description of enclosure 104, which may also be referred to as a cabana, is discussed with respect to two states as mentioned above, namely 1) a usable state, as depicted in FIGS. 1-3, and 2) a collapsed state, as depicted in FIGS. 4-6. In the usable stage, components of enclosure 104 are positioned with respect to each other so that enclosure 104 is in an elongated condition. In the collapsed state, components of enclosure 104 are positioned with respect to each other so that enclosure 104 is in a shortened condition. In the collapsed state (i.e., shortened condition), enclosure 104 requires less physical volume of space, thereby enhancing the portability thereof since a transporter is able to transport more toilet systems 100 in the same amount of space than would be possible if fixed in the usable state, and/or alternatively, a transporter is able to transport a toilet system 100 with a smaller sized transport than would be required for a toilet system 100 if fixed in the usable state. Accordingly, the collapsibility of toilet system 100 may provide multiple economic advantages.

In an embodiment, enclosure 104 may include a door 126, a top cover 128, and a privacy shield that wraps around the waste disposal subsystem 102 to enclose enclosure 104 from floor 114 to top cover 128 when door 126 is closed. The privacy shield may be a single continuous wall (not shown) having a perimeter of varying shape, or, as described below, the privacy shield may be formed of multiple sections.

In an embodiment as depicted in the usable state in FIGS. 1-3 (and partially in the collapsed state in FIGS. 4-6), the privacy shield may be formed of a plurality of wall sections 130A(1), 130A(2), ..., 130A(n), 130B(1), 130B(2), ... 130B(n). That is, when not formed as a single continuous wall, the privacy shield may be formed of multiple adjoining pieces that fit together to form a visible shield surrounding the toilet area and that may disassemble or collapse together for convenient transportation and portability. Moreover, while toilet system 100 as depicted includes three basic layers/tiers of wall sections to form the privacy shield, it is contemplated that collapsible embodiments with other numbers of layers may be formed and still remain within the concept of the instant disclosure. For example, an enclosure may include two taller tiers, or four, five, six, etc. shorter tiers. Hence, the reference to wall sections 130A(1), 130A(2), ..., 130A(n), etc., where "n" is an integer greater than 2.

A change to the number of tiers of wall sections forming the enclosure may have advantages depending on what is sought, such as to achieve similar average height measurements to accommodate people of varying heights, or to facilitate setup of the toilet systems, or to facilitate particular transportation limitations. Further, while the sections of a multi-section privacy shield are described herein below as being disposed at specific sides (e.g., right side 116, left side 118) of enclosure 104, it is understood that one skilled in the art would be able to swap the orientation of the sections, such that a section depicted in the figures on the right side could be changed to the left side and vice versa. Nevertheless, such a side to side reorientation of the wall sections described herein is not considered to depart from the scope of this disclosure.

Therefore, as a non-limiting example, in an embodiment of a cylindrical shape as depicted, the privacy shield of enclosure 104 may include a first left wall section 130A(1), a second left wall section 130A(2), and an nth left wall section 130A(n), as well as a first right wall section 130B(1), a second right wall section 130B(2), and an nth right wall section 130B(n). In the usable state, wall sections may be disposed relative to each other such that: first left wall section 130A(1) is the uppermost wall section on left side 118 of enclosure 104, second left wall section 130A(2) is a middle left wall section, and nth left wall section 130A(n) is the lowermost left wall section. Likewise, in the usable state, first right wall section 130B(1) is the uppermost wall section on right side 116 of enclosure 104, second right wall section 130B(2) is a middle right wall section, and nth right wall section 130B(n) is the lowermost right wall section.

In the above orientation and in the usable state, the vertical dimensions of the wall sections may be defined relative to the other sections such that: the respective upper edges of first left wall section 130A(1) and first right wall section 130B(1) abut the underside of top cover 128; the respective lower edges of first left wall section 130A(1) and first right wall section 130B(1) are disposed adjacent to the respective upper edges of second left wall section 130A(2) and second right wall section 130B(2); the respective lower edges of second left wall section 130A(2) and second right wall section 130B(2) are disposed adjacent to the respective upper edges of nth left wall section 130A(n) and nth right wall section 130B(n); and the respective lower edges of nth left wall section 130A(n) and nth right wall section 130B(n) abut floor 124.

Additionally, in an embodiment as depicted, first left wall section 130A(1), second left wall section 130A(2), and nth left wall section 130A(n) each extend radially in a direction along a horizontal plane. Thus, left wall sections 130A(1), 130A(2), ... 130A(n) form the left edge of the opening entrance of enclosure 100, with which the left side of door 126 abuts when closed, and extend to a position adjacent to lateral edges of wall sections 130B(1), 130B(2), ... 130B(n), respectively. The length of the arc of radial extension of left wall sections 130A(1), 130A(2), ... 130A(n) may form a portion of the perimeter of enclosure 104 ranging from about half to about three-quarters of the perimeter, or more or less. Likewise, the length of the arc of radial extension of right wall sections 130B(1), 130B(2), ... 130B(n) may form a portion of the perimeter of enclosure 104 ranging from less than about a quarter to about half of the perimeter, or more or less. That is, between the sizes of the left wall sections and the right wall sections, an interior of enclosure 104 is sufficiently concealed for privacy. Further, in an embodiment (as depicted), each of first left wall section 130A(1) and right wall section 130B(1) may have a upper portion that wraps entirely around the perimeter, disposed so as to define an upper edge of the entrance to enclosure 104 and to provide structural rigidity overall and support for top cover 128.

Notably, in an embodiment as shown, the respective radii of right wall sections 130B(1), 130B(2), ... 130B(n) may be larger than the respective radii of correspondingly arranged left wall sections 130A(1), 130A(2), ... 130A(n). As such, respective left wall sections 130A(1), 130A(2), ... 130A(n) may be slightly overlapped by the adjacent respective edges of right wall sections 130B(1), 130B(2), ... 130B(n). This difference in radius may allow for door 126 to slide back along an inner side of right wall sections 130B(1), 130B(2), ... 130B(n).

Alternatively, in an embodiment not shown, an enclosure may include a privacy shield formed using only one set of wall sections, instead of the right and left sets discussed above, that serve as walls extending around the portion of the perimeter of the enclosure from the left edge of the entrance to the right edge of the entrance so as to leave a gap for the entrance, which may be enclosed by a door. In such an embodiment, the door may be positioned on the outside or on the inside of the enclosure. However, users may feel more secure if the door is positioned inside the enclosure to facilitate keeping the door closed when, for example, someone tries to force open the door from the outside. Further, the door may slide on a track or may swing on pivoting hinges, or a combination of both.

Though a variety of embodiments for a toilet paper dispenser 132 are possible for inclusion with enclosure 104, the box depicted with reference number 132 in FIG. 1 is representative of a toilet paper dispenser.

The door of enclosure 104 may be a unitary piece (not shown) that attaches to the entrance when toilet system 100 is in the usable state, or, as depicted, door 126 may be formed of a plurality of door sections 126(1), 126(2), ..., 126(n). Inasmuch as door 126 includes multiple sections arranged in layers/tiers, the respective door sections 126(1), 126(2), ..., 126(n) are vertically positioned and aligned in a manner similar to the correspondingly positioned and labeled wall sections of enclosure 104, as described above (i.e., tiers/levels 130A(1) and 130B(1) are in the same tier/level as 126(1)). That is, door section 126(1) may have a radius larger than a radius of door section 126(2), which radius is larger than a radius of door section 126(n), in order to allow minimal overlapping of adjacent edges when in the usable state, and to allow full overlapping when in the collapsed state. Accordingly, in view of the structural similarities shown in the detailed figures between the door sections and the wall sections depicted and described above, it is believed that one skilled in the art would understand how door sections 126(1), 126(2), . . . , 126(n) are relatively disposed in the usable state and the collapsed state (described in more detail below). Thus, an explanation of the orientation of the door sections is not further elaborated on here.

With respect to the material used to form wall sections or door sections, any suitable, durable material is acceptable. It is noted, however, that it is contemplated that the lower section may be transparent, which may be useful for a variety of purposes including verifying appropriate user behavior (e.g., standing or sitting, and not sleeping or trapped).

With respect to the overall shape of enclosure 104, while depicted as circular, enclosure 104 may be of any shape suitable to accommodate average or larger than average users. For example, enclosure 104 may be circular, ovular, triangular, rectangular, quadrangular, pentagonal, hexagonal, heptagonal, octagonal, etc. Regardless of shape, enclosure 104 may be fixed to floor 114 (the top of waste storage basin subsystem 106) or may be removable for enhancing portability. Additionally, enclosure 104 may have a custom mold interior and exterior of plastic to reflect different themes, (e.g., jazz instruments for a jazz festival, burning man for burning man, etc.).

While waste disposal subsystem 102 may be accessed from inside enclosure 104, it is contemplated herein that waste disposal subsystem 102 may alternatively be accessed from a rear outside of enclosure 104. That is, a wall section of enclosure 104 may have an access panel therein (similar to removable or displaceable portion 124 in panel wall 112), which may be opened from the outside of enclosure 104 and via which waste disposal subsystem 102 may either be slid outward on a track system (not shown) or simply accessed externally.

Illustrative Embodiments of a Waste Storage Basin Subsystem

In an embodiment, waste storage basin subsystem 106 may include a housing 134 that provides a support structure for an access step 136 and a waste storage bin 300 (FIG. 3). Note that, while housing 134 and access step 136 are each depicted as cuboidal in shape, it is contemplated that other shapes are possible, including other parallelepiped, cylindrical, etc.

Access step 136 may be included to assist users entering into toilet system 100, as enclosure 104 sits up higher than ground level. Further, access step 136 may be concealable within housing 134 to facilitate transportation of toilet system 100. More specifically, while it is contemplated that, in an embodiment, access step 136 may be a separately attachable step, it is also contemplated that, in an alternative embodiment, access step 136 may be stored within housing 134 during transportation (i.e., in the collapsed state) and then pulled out through a correspondingly shaped opening in a front wall 138 of housing 134.

Figure 7:
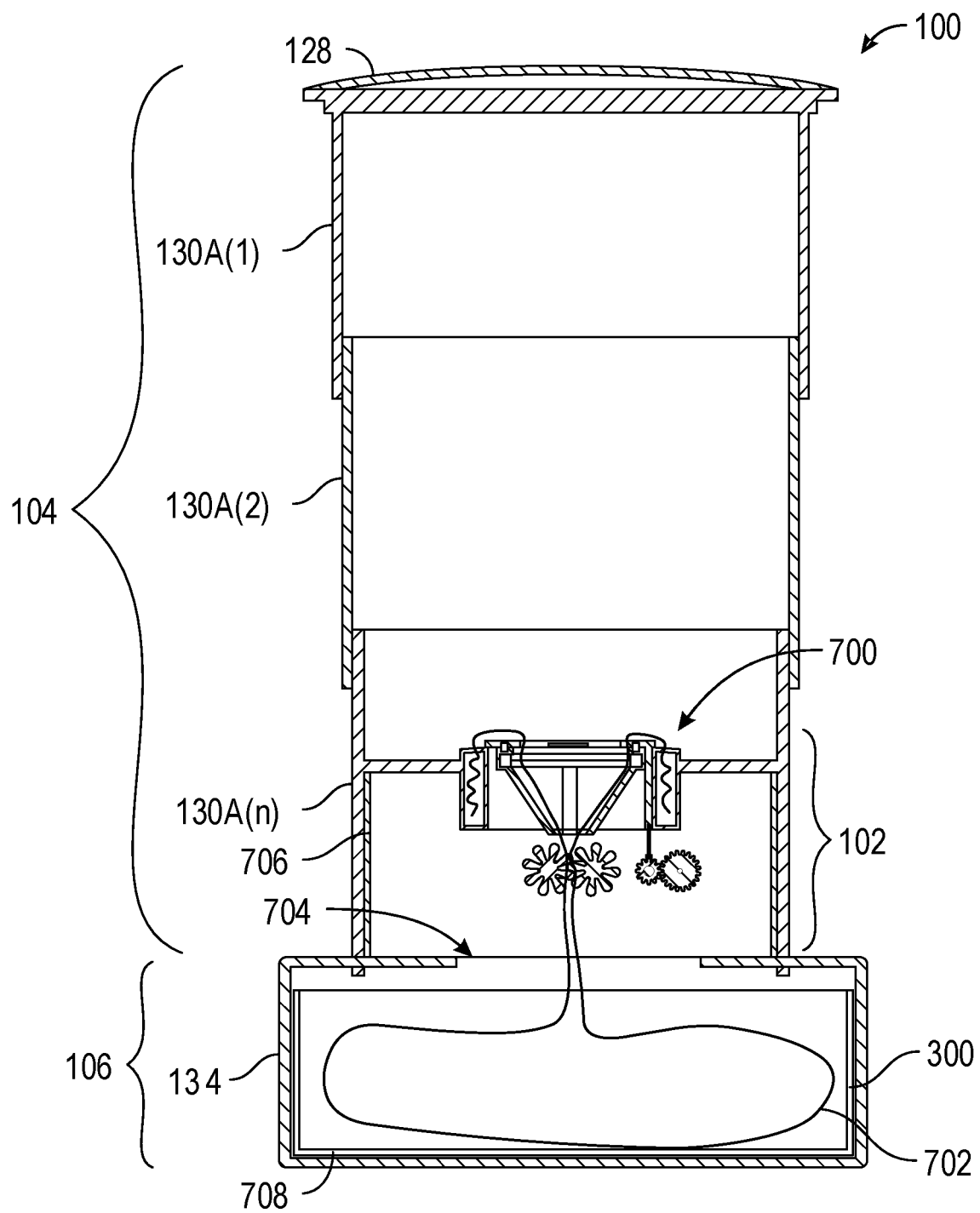
FIG. 7 illustrates cross-sectional plan view taken from the front of the toilet system of FIG. 1, showing a waste storage basin, a toilet seat, and gears according to an embodiment of the instant disclosure.
Figure 8:
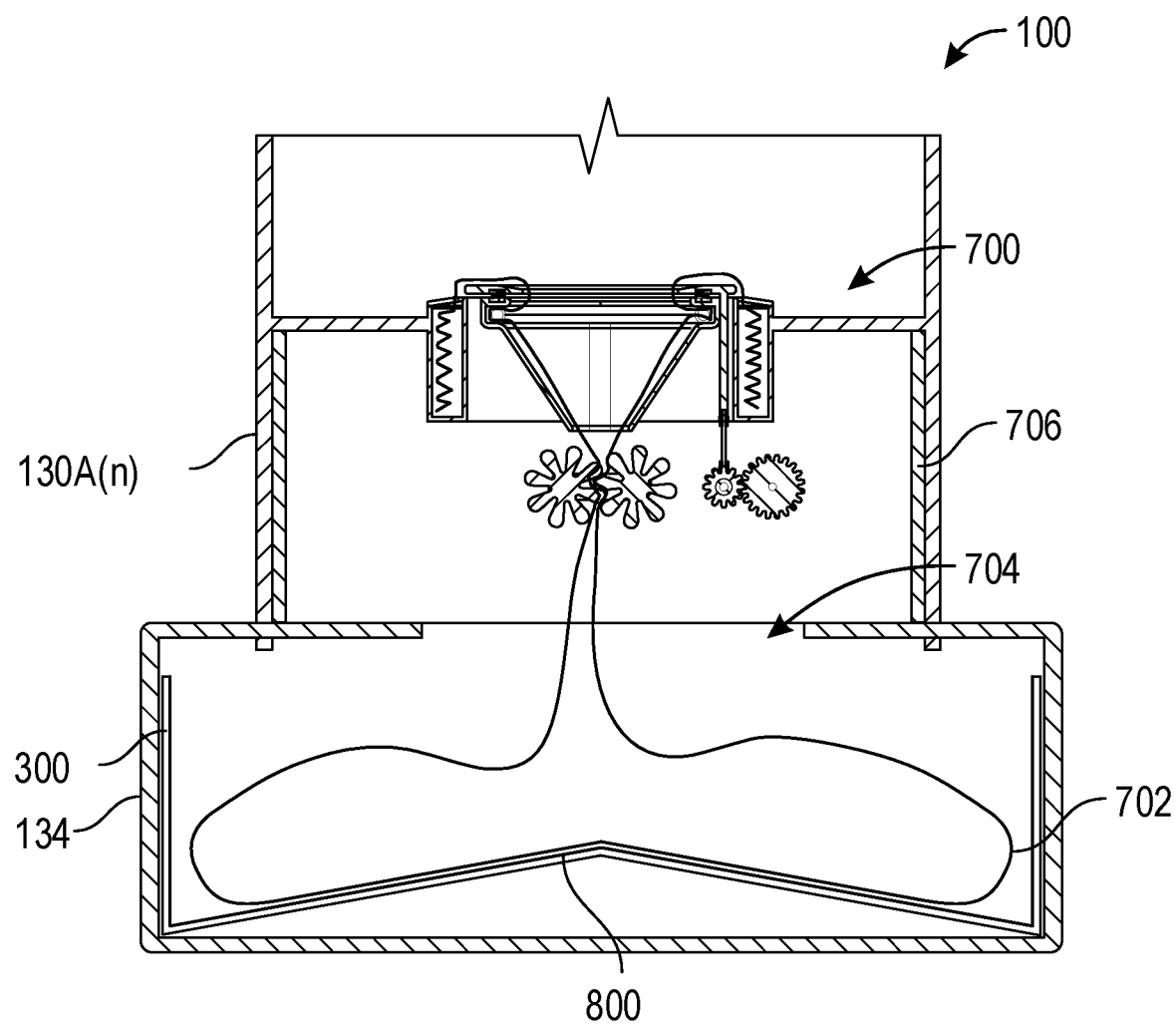
FIG. 8 illustrates an enlarged cross-sectional plan view of a portion of the toilet system showing a toilet seat basin along with gears and a waste storage basin according to an embodiment of the instant disclosure.

Waste storage bin 300 may be incorporated to capture waste that has been advanced from waste disposal subsystem 102. In an embodiment, the structure of waste storage bin 300 may be a drawer having a base, one or more sidewalls, and an open top into which the waste falls (see the "drawer" embodiment in FIG. 7) through a hole (not shown in FIGS. 1-6) through floor 114 in housing 134 located beneath toilet seat basin 108. Waste storage bin 300 may be slidable into and out from a rear wall 302 of housing 134 for waste removal. When positioned within housing 134, waste storage bin 300 may be secured in place via a keyed/coded mechanism (not shown) to minimize tampering and to allow an authorized service provider to slide out (either partially or entirely) waste storage bin 300 to remove the waste. For example, an authorized service provider may have a special key, an RFID fob, a time and/or location limited access card/device, a WiFi or other wireless signal enabled capability (e.g., communication from a mobile device to a receiver on the toilet system to provide an unlock command), etc. for access to waste storage bin 300. While in one embodiment, a simple waste storage bin 300 is contemplated as described above, in an alternative embodiment, waste storage bin 300 may have a waste dispersion feature, which is described hereinafter with respect to a cross-sectional view of toilet system 100, as shown in FIG. 8.

Toilet system 100 may implement waste storage basin subsystem 106 positioned beneath enclosure 104 such that an upper surface 140 of housing 134 may serve as floor 114. Alternatively, in an embodiment not shown, floor 114 may be a base structure integrated in enclosure 104, distinct from upper surface 140 of housing 134, and enclosure 104 would be secured to upper surface 140 of waste storage basin subsystem 106.

Collapsed State

In FIGS. 4-6, while the directionality of the views of toilet system 100 is the same as seen in FIGS. 1-3, respectively, toilet system 100 is depicted in the collapsed state in FIGS. 4-6. While clearly conventional portable toilets are transported in the full-bodied usable state, the collapsed state of toilet system 100 described herein is advantageous for the transportable state as well because the vertical volume needed to transport toilet system 100 is reduced significantly, which reduces drag when traveling. As such, it is contemplated that multiple toilet systems 100 may be stacked vertically on one another. Thus, where a vehicle may have previously been capable of transporting six, for example, conventional portable toilets, side by side in a 2×3 matrix on a truck bed, the same truck bed may be capable of transporting 12 or 18 collapsed toilet systems 100, when stacked two or three to a stack, respectively. Accordingly, a toilet system that is collapsible has significant advantages for the industry. Additionally, it is contemplated that a locking mechanism may be placed on the top and bottom of toilet system 100 to securely stack and lock toilet systems together for ease of storage and shipping. Furthermore, FIG. 4 shows that access step 136 may be stored within housing 134 to assist in reducing the footprint of the transportable, collapsed state of toilet system 100.

A process of reducing the height of toilet system 100 to the collapsed state may include sliding left and right wall sections down over each other such that the lowermost wall sections(s) (e.g., 130A(n) and 130B(n)) is/are disposed concentrically (for a circular embodiment of enclosure 104) in an innermost position with respect to the middle section(s) and the uppermost section(s), with the uppermost section(s) (e.g., 130A(1) and 130B(1)) being in the outermost position. Moreover, in the interest of maintaining the integrity of features of and within toilet waste disposal subsystem 102, it is contemplated that one or more wall sections (e.g., nth wall section 130A(n), as seen in FIG. 7) have a minimum collapsible position and/or a minimum height such that wall sections collapse and maintain top cover 128 at or above toilet seat 120.

Additionally, though only depicted in FIG. 6, in an embodiment, one or more wheels 600 may be removably disposed on housing 134 of waste storage basin subsystem 106, in any feasible position and not only as depicted, to facilitate portability when transporting. For example, a service provider may collapse enclosure 104 (if collapsible) and lift an edge of toilet system 100, in this case the front edge, to bear the weight of toilet system 100 on wheel(s) 600, either in a tilted or upright position, to roll toilet system 100 into or out of the desired location.

With respect to the manner in which collapsing and positioning the wall sections in the usable state is achieved, a plurality of mechanical solutions are possible and conceivable. For example, walls sections may have rotational locking positions, frictional interference, interior and/or exterior vertically extending supports between the floor and the top cover that may also be collapsible, indent and detent matching, pin and hole matching, etc. Though the specific manner is not depicted, it is contemplated that one skilled in the art would be capable of selecting an adequate mechanism to secure the enclosure in the usable state and the collapsed state.

Illustrative Embodiments of a Liner Advancement Mechanism

As shown in FIGS. 7 and 8, toilet waste disposal subsystem 102 may include a liner advancement mechanism 700. Details of the multiple gears, etc. of liner advancement mechanism 700 are discussed with respect to FIGS. 9-15. Nevertheless, liner advancement mechanism 700 is shown in cross section within enclosure 104. In an embodiment, liner advancement mechanism 700 may include a replaceable, disposable liner 702 into which waste is expelled from users of toilet system 100, and which is advanced after each use to provide a fresh lining of liner 702 on toilet seat 120. Liner 702 is advanced into waste storage bin 300 via a hole 704 through upper surface 140 of housing 134. To assist in reinforcing the weight capacity of basin cover 110, an additional inner support wall 706 may be formed between floor 114 to the underside of base in cover 110.

As the waste is advanced into waste storage bin 300, depending on the consistency of the waste, it is possible that waste may pile up in a central location within waste storage bin 300 and reduce the number of uses of toilet system 100 before service is needed. In FIG. 7, waste storage bin 300 is shown in cross section as having a planar base 708. In an embodiment where base 708 is constantly planar, the concern is greater regarding waste piling in a central position instead of spreading out evenly across and throughout a height of waste storage bin 300.

Accordingly, in an embodiment as depicted in FIG. 8, waste storage bin 300 incorporates a waste dispersion base 800 to assist in driving advancing waste across the entirety of waste storage bin 300. Waste dispersion base 800 may include a rigid or flexible base sheet that is bent and placed in waste storage bin 300 to have a peak that coincides with the waste advancement position beneath toilet seat 120. As such, when waste descends in liner 702, the waste approaches the peak of waste dispersion base 800 and may be dispersed laterally, in either direction, down a sloped surface of waste dispersion base 800 that extends from the peak to the sidewall(s) of waste storage bin 300. Notably, several variations of a "peak" in base 800 are possible. For example, waste dispersion base 800 may have a peak that runs from one sidewall to an opposite sidewall, thereby dispersing waste in at least two lateral directions. Alternatively, waste dispersion base 800 may have a conical peak so as to disperse waste in multiple directions. As indicated above, in an embodiment, waste dispersion base 800 may be rigid, in which case, though useful for dispersal, ultimately waste storage bin 300 may hold less waste before needing service. However, in an embodiment where waste dispersion base 800 is flexible material, waste may be dispersed adequately for a time until the weight of waste against the surface of waste dispersion base 800 exceeds a threshold opposing structural force from the position and material resistance strength to flexure. Upon exceeding the threshold force, the peak of waste dispersion base 800 may reverse direction, flipping downward (not shown) or even resting in a planar state (see FIG. 7, for example) to allow more waste to be added before service is needed. In this manner, piling up of the waste may be minimized and the amount of advanced waste is maximized, thereby reducing the amount of service required.

To advance the waste, liner advancement mechanism 700 may include a pair of liner advancement gears 900, specifically, a first gear 902 that engages a second gear 904 having liner 702 (and waste when present) fed between the teeth of first gear 902 and second gear 904. First gear 902 and second gear 904 are disposed beneath basin cover 110, toilet seat 120, and a toilet bowl 906 and positioned to pull down, encapsulate (i.e., via interlocked teeth), and secure waste from a user, including feces, urine, toilet paper, and other waste, in liner 702. In an embodiment, first gear 902 and second gear 904 may be formed of an elastic, durable material, such as a rubberized foam, in order to be able to manipulate waste, bottles, cans, etc. therebetween upon advancement of liner 702. Moreover, in an embodiment, the "teeth" of first gear 902 and second gear 904 may include rounded appendages that extend radially and longitudinally from the respective center axes. These teeth interlock together when first gear 902 and second gear 904 are rotated. The teeth may be slightly offset to allow a space for waste to be pulled through the rubber teeth. Further, as discussed herein, the teeth are capable of moving, both laterally and due to the nature of the rubberized material, to give space to allow a beer can or a beer bottle to be pulled through.

The actuation of liner advancement gears 900 is discussed further herein below.

Figure 16:
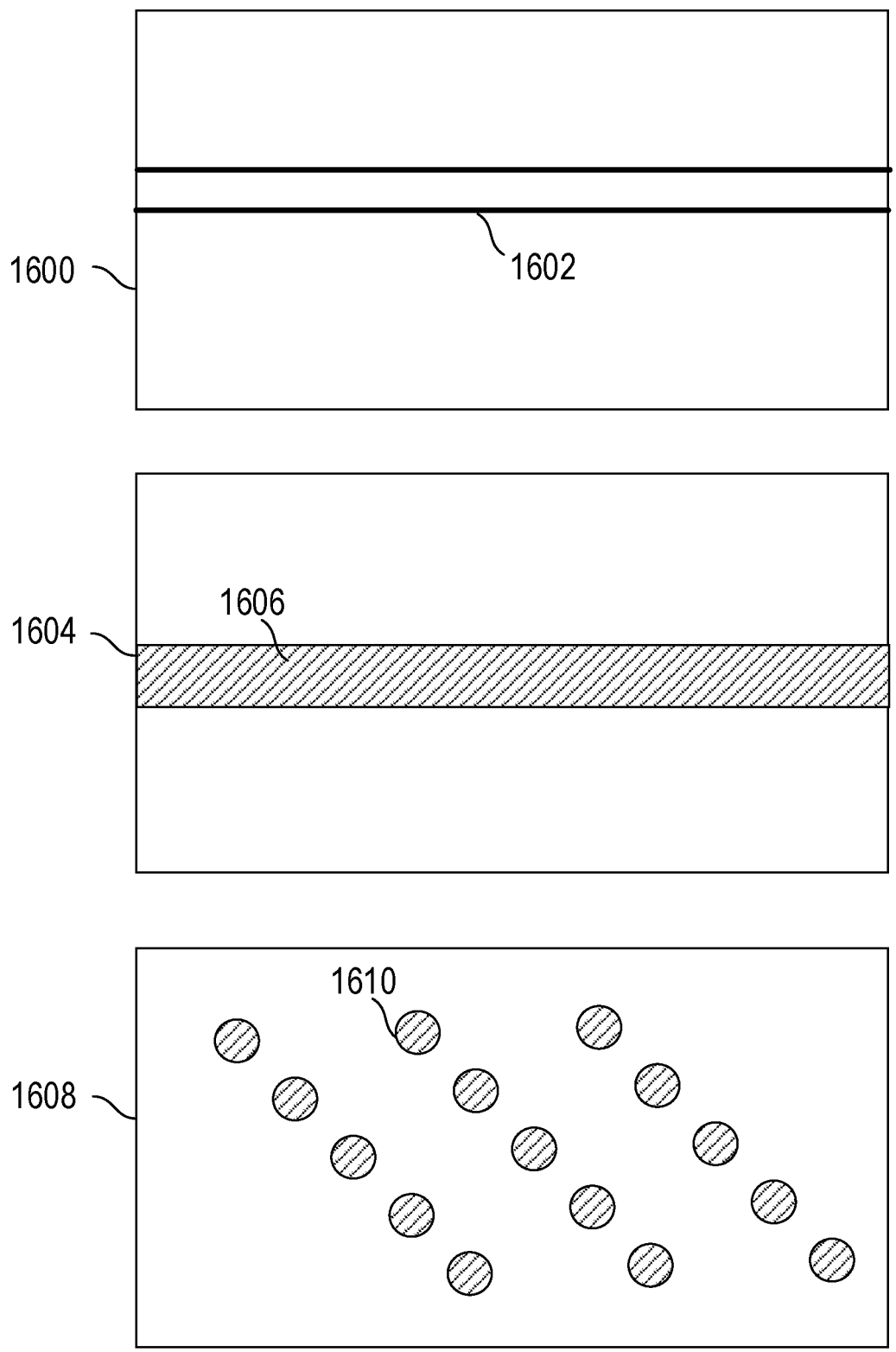
FIG. 16 illustrates three variations of liner embodiments according to the instant disclosure.

Liner 702 may be a tubular plastic or other suitable material and may be of a biodegradable or non-biodegradable type. In an embodiment, a liner 1600 (see FIG. 16) may further contain one or more thin metallic wires 1602 that extend throughout the length of liner 1600 to strengthen liner integrity and to minimize risk of vandalism that may occur such as if a user tried to cut liner 1600. That is, in an embodiment, an electrical wire, such as metallic wire 1602, may be embedded in liner 1600 such that, if cut, a power circuit is cut and door 126 will not open from the outside. Sometimes, users vandalize portable toilets, and may try to cut liner 1600 to stop liner 1600 from resetting after each use. As an alternative means of detecting the status of liner 702, whether damaged accidentally or intentionally cut, a distance sensor 924 (e.g., laser with feedback, etc.) may be embedded into toilet seat 120 and pointing toward liner 702. When the feedback shows a significant change in distance detected, an alert may be sent to a service provider to check whether liner 702 has been cut or otherwise affected.

Additionally, and/or alternatively, in an embodiment, liner 1604 may include a strip 1606 of highly absorbent material that runs through the length of liner 1604, incorporated therein when manufactured; or in an embodiment of liner 1608, highly absorbent material may be added in random or patterned locations 1610 dispersed throughout the length of liner 1608. Such absorbent material may assist in minimizing splattering of fluid excretions from users and simplify evacuation of the waste when being serviced. Moreover, the absorbent material may have chemicals, such as urea, loaded therein to assist in decomposition of the waste, deodorizing the waste, etc.

Figure 9:
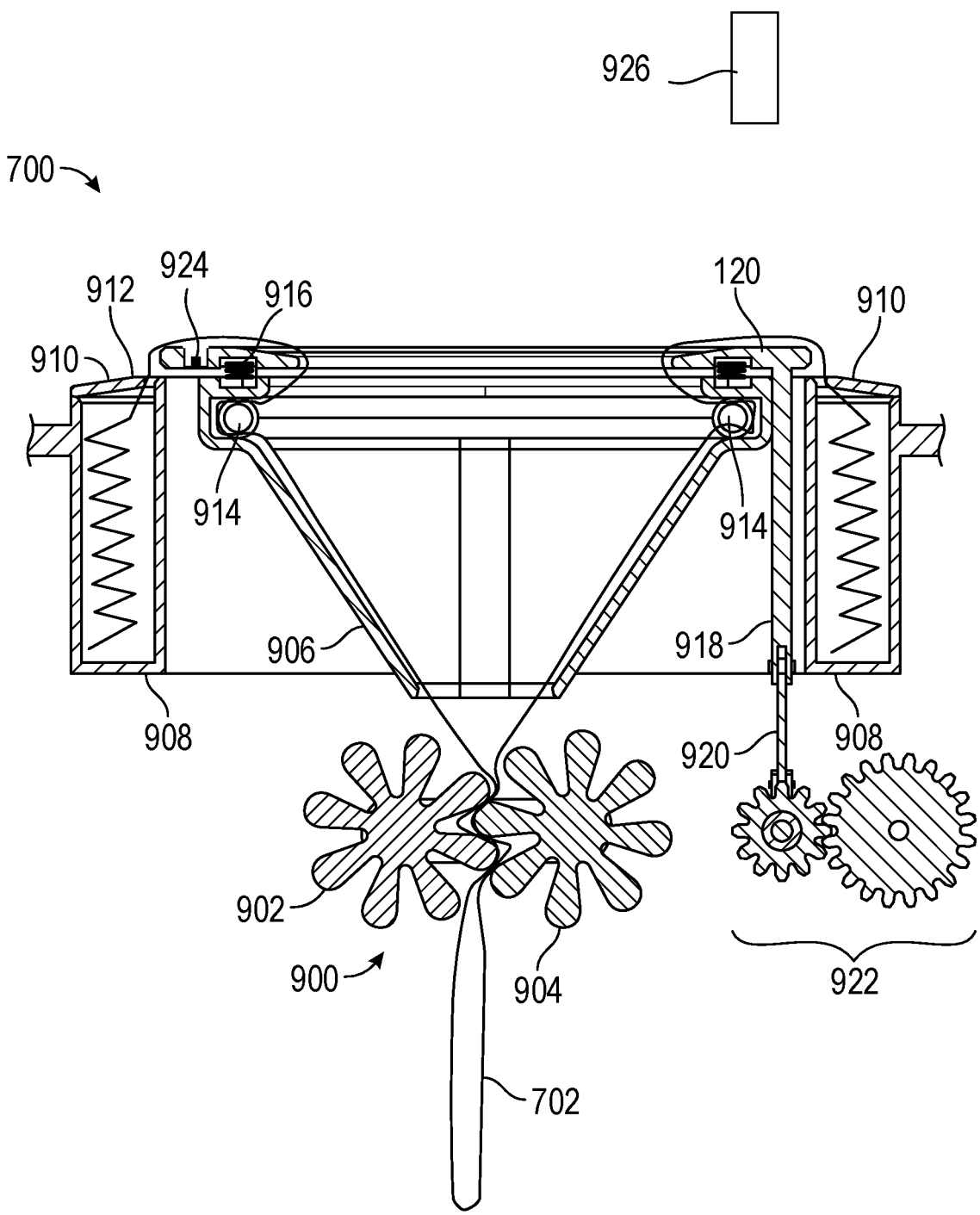
FIG. 9 illustrates an enlarged cross-sectional plan view of a portion of the toilet system showing the toilet seat basin and the gears of FIG. 8 according to an embodiment of the instant disclosure.

Liner 702 may be supplied for lining toilet seat 120 via a liner supply bin 908 that surrounds toilet seat 120 and toilet bowl 906. Liner supply bin 908 contains a limited supply of continuously advanceable waste storage liner 702. As depicted in FIG. 9, liner 702 may be disposed directly within liner supply bin 908. Alternatively, liner 702 may be provided via disposable liner canisters (not shown), which may be inserted into liner supply bin 908. After insertion, liner 702 is pulled out, tied into a knot (if needed), and pushed through first gear 902 and second gear 904 to start lining toilet seat 120. A cover 910 may be disposed over liner supply bin 908 partially, so as to leave a liner exit gap adjacent toilet seat 120, whereby liner 702 passes out of liner supply bin 908 and over toilet seat 120 to be pulled against toilet bowl 906. Cover 910 may include a flexible flange element 912 (e.g., directly integrated or added to cover 910) adjacent the liner exit gap against liner 702 to minimize the risk of urine or other elements falling and coating liner 702 in liner supply bin 908 before liner 702 advances. In an embodiment, toilet bowl 906 may be funnel shaped to direct liner 702 and waste into first gear 902 and second gear 904.

Toilet waste disposal subsystem 102 may further include a liner spreader member 914 to facilitate the advancement of liner 702. Liner spreader member 914 may be disposed in a concave portion of toilet bowl 906 beneath toilet seat 120. Liner spreader member 914 may be tubular and surround toilet bowl 906. Liner spreader member 914 may be flexible to bend and be inserted within the concave portion, so as to spring into the concave portion and secure liner 702.

In order to avoid advancement of liner 702 while a user is still seated on toilet seat 120, a disengagement feature of the advancement mechanism may be incorporated. In an embodiment, a spring 916 may be disposed between toilet seat 120 and toilet bowl 906. Spring 916 may provide a bias force upward against toilet seat 120 when a user is not sitting on toilet seat 120. Spring 916 may provide minimal lift of toilet seat 120, such as ¼ inch, for example. Thus, when a user sits on toilet seat 120, spring 916 is depressed, toilet seat 120 lowers, which lowering engages an actuation arm 918 connected to an underside of toilet seat 120. Actuation arm 918 extends from toilet seat 120 to engage a liner advancement disengagement member 920. Liner advancement disengagement member 920 is engaged with a gear system 922 (FIG. 9 only shows part of gear system 922, which is described in greater detail below) that actuates the rotational interaction between first gear 902 and second gear 904.

Figure 10:
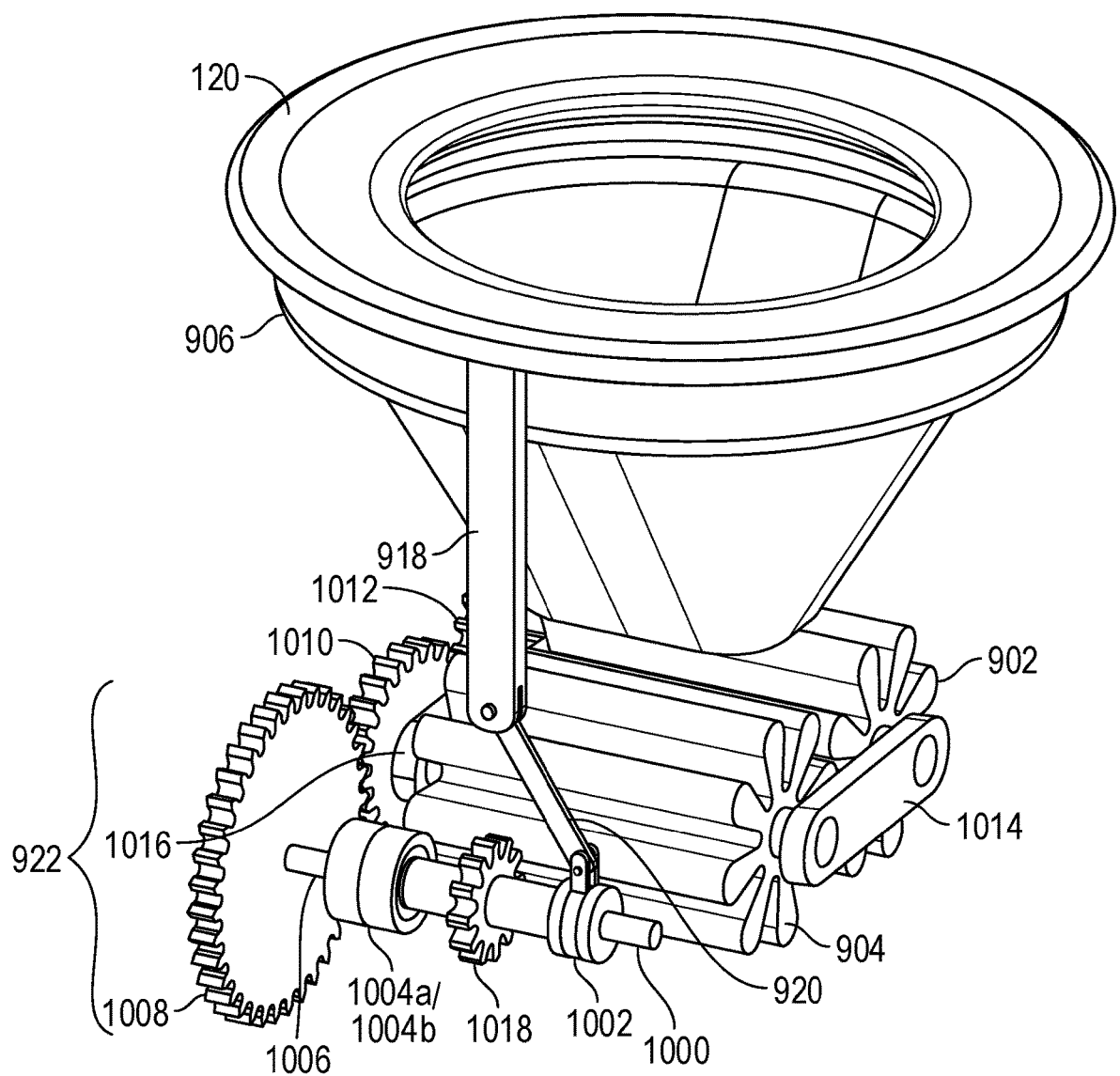
FIG. 10 illustrates an enlarged perspective view of a portion of the toilet system taken from the back corner depicting the toilet seat basin and the gears of FIG. 8 according to an embodiment of the instant disclosure.

With respect to FIG. 10 and the actuation of disengagement of the advancement of liner 702, when a user sits on toilet seat 120, actuation arm 918 causes liner advancement disengagement member 920 to move an engagement shaft 1000 out of engagement position with gear system 922, thereby disengaging and preventing gear system 922 from advancing liner 702 while a user is seated. As such, if the door to the enclosure is opened, either unexpectedly or intentionally (i.e., if a parent needs to help a child seated on toilet seat 120), liner 702 will not advance beneath the user's body.

Gear system 922, for actuating advancement of liner 702, is geared to ultimately actuate first gear 902 and second gear 904. In an embodiment, gear system 922 may include: disengagement arm connection collar 1002 that is attached to a first end of shaft 1000 and opposing-toothed engagement gear members 1004*a* and 1004*b* ("gear members 1004*a*, 1004*b*"), which engage when toilet seat 120 is lifted and disengage when toilet seat 120 is depressed by a user. Gear member 1004*b* is disposed on the second end of shaft 1000, on the opposite side from where liner advancement disengagement member 920 is attached, and gear member 1004*a* may be disposed along the same axial direction as shaft 1000 in line with and proximate to gear member 1004*b* so as to engage therewith upon actuation of the advancement mechanism. Gear member 1004*a* is disposed on a shaft 1006 connected to a third liner advancement gear 1008 ("third gear 1008").

Figure 11:
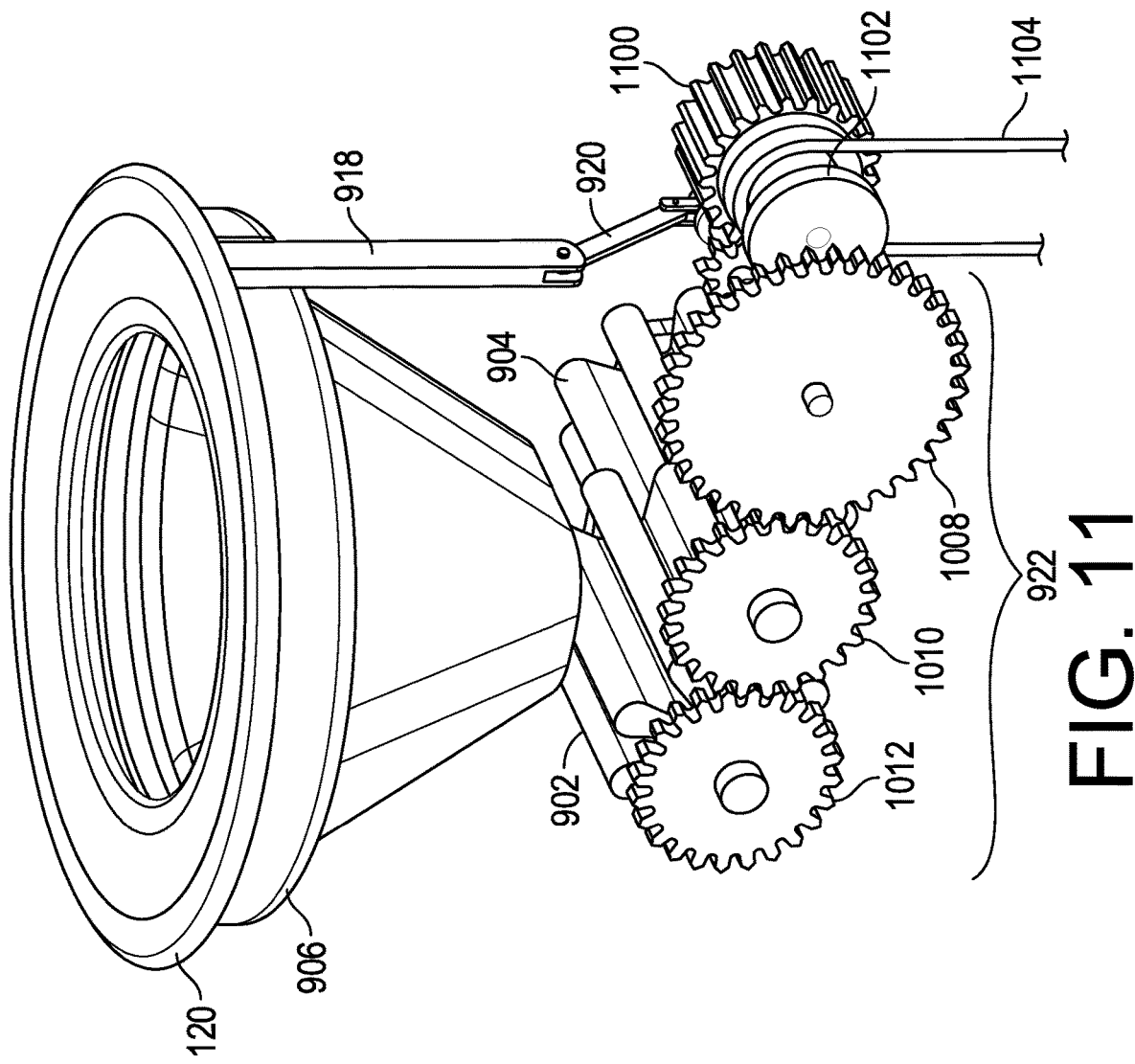
FIG. 11 illustrates an enlarged perspective view of a portion of the toilet system taken from the front corner depicting the toilet seat basin and the gears of FIG. 8 according to an embodiment of the instant disclosure.
Figure 12:
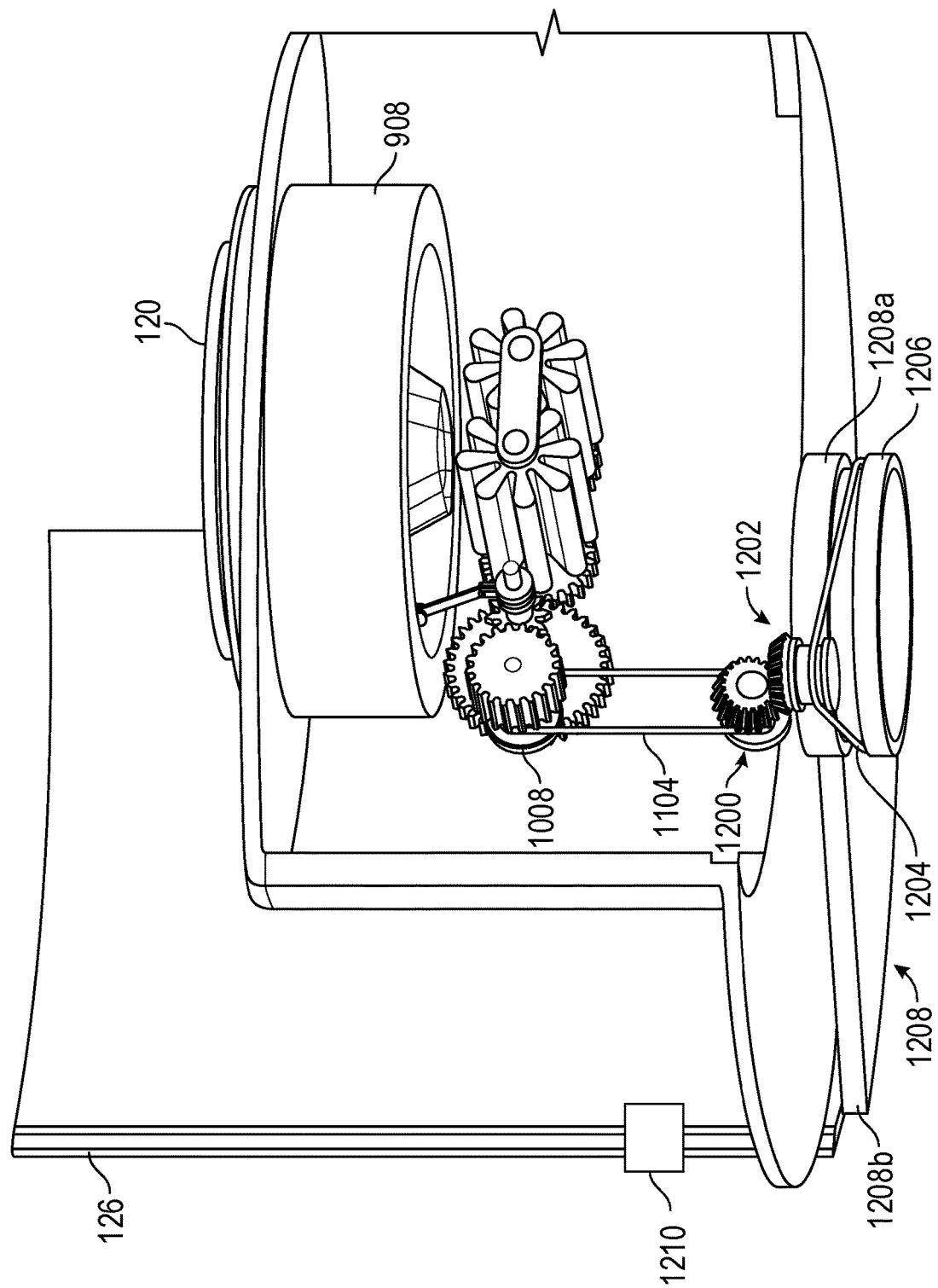
FIG. 12 illustrates an enlarged perspective view of a portion of the toilet system taken from the back corner depicting bottom door components, the toilet seat basin and the gears of FIG. 8 according to an embodiment of the instant disclosure.
Figure 13:
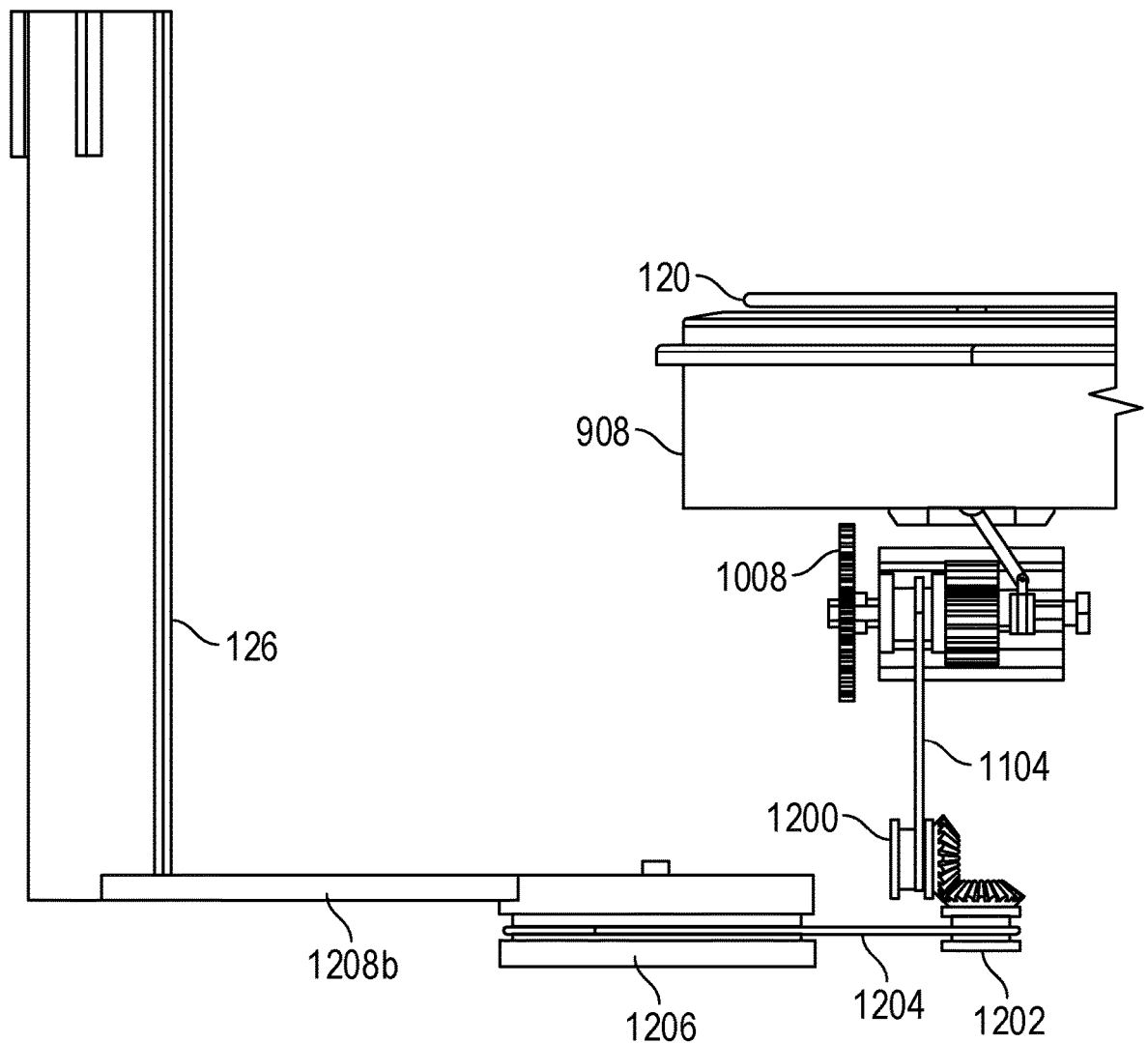
FIG. 13 illustrates an enlarged side view of a portion of the toilet system showing the bottom door components, the toilet seat basin, and the gears of FIG. 8 according to an embodiment of the instant disclosure.
Figure 14:
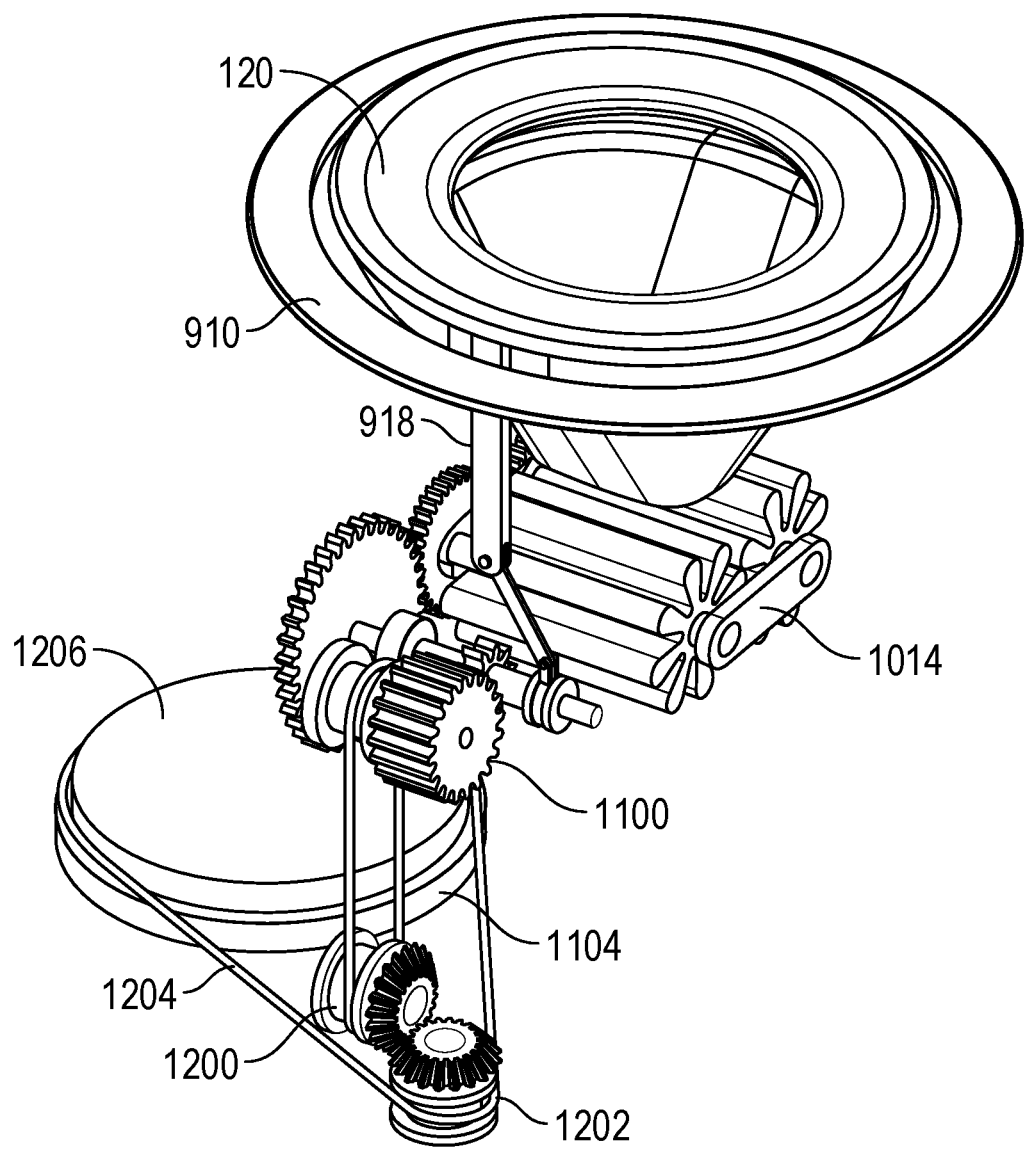
FIG. 14 illustrates an enlarged perspective view of a portion of the toilet system showing a bottom door component, the toilet seat basin, and the gears of FIG. 8 according to an embodiment of the instant disclosure.
Figure 15:
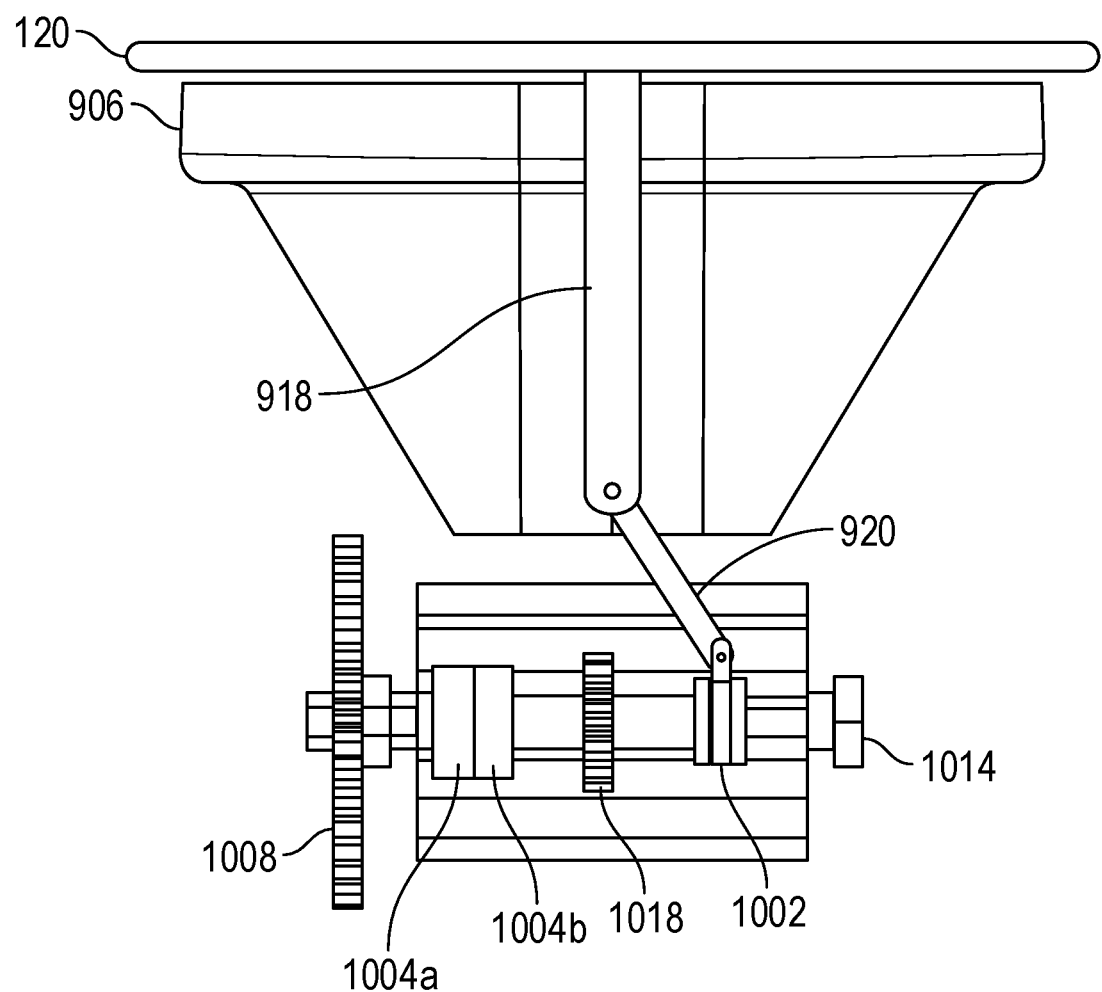
FIG. 15 illustrates an enlarged side view of a portion of the toilet system showing the toilet seat basin and the gears of FIG. 8 according to an embodiment of the instant disclosure.

Additionally, in gear system 922, the teeth of third gear 1008 engage teeth of a fourth liner advancement gear 1010 ("fourth gear 1010"), which further engage teeth of a fifth liner advancement gear 1012 ("fifth gear 1012") (see also FIG. 11). Fourth gear 1010 and fifth gear 1012 are connected via axial shafts to the respective central axes of second gear 904 and first gear 902. Thus, when the door of the enclosure opens and a user is not seated on toilet seat 120, liner advancement disengagement member 920 is in the engaged position. When in the engaged position, the rotational engagement, caused by the opening of the door, between opposing-toothed engagement gear members 1004*a* and 1004*b* thereby causes subsequent rotation of third gear 1008, which simultaneously rotates fourth gear 1010, fifth gear 1012, first gear 902, and second gear 904. Note, a first joiner bar 1014 and a second joiner bar 1016 are disposed to connect opposing longitudinal ends of first gear 902 and second gear 904. Moreover, first joiner bar 1014 and second joiner bar 1016 are connected at the respective axes thereof, to hold first gear 902 and second gear 904 in enduring contact. In an embodiment, first joiner bar 1014 and second joiner bar 1016 may include a spring member (shown as solid joiner bar, and/or be formed of a material that permits some expansion and contraction to tolerate potential abuses of the waste system, whereby first gear 902 and second gear 904 may be forced to separate laterally to some extent to accommodate passage of unexpectedly large items (i.e., bottles, trash, etc.). For example, first and second joiner bars 1014 and 1016 may act as coiled springs via the choice of material, whereby stretching is possible with a return to the original shape. The use of an actual coiled spring is further contemplated.

Additionally, in an embodiment, gear system 922 may further include a liner advancement actuation/prevention gear 1018 disposed on shaft 1000 between collar 1002 and opposing-toothed engagement gear member 1004*b*. When toilet seat 120 is not in the depressed position, liner advancement actuation/prevention gear 1018 is disposed in a first state having gear teeth engaged with yet a sixth liner advancement gear 1100 ("sixth gear 1100"), as seen in FIG. 11. Thus, upon actuation of the door, in the first state, liner advancement actuation/prevention gear 1018 will engage with sixth gear 1100, causing shaft 1000 to rotate and induce liner 702 to advance as described above. However, when seat 120 is depressed, liner advancement disengagement member 920 shifts shaft 1000 axially and displaces liner advancement actuation/prevention gear 1018 out of toothed engagement with sixth gear 1100, thereby preventing rotation of shaft 1000 when the door is open, and thereby preventing advancement of liner 702.

With respect to the components that create the rotational engagement to advance liner 702 when the door is opened, a first door pulley 1102 may be attached in rotational alignment to sixth gear 1100 and may be coupled with a first pulley cable 1104, which is further coupled to a second door pulley 1200. Second door pulley 1200 may include angled teeth on a side thereof, such as on a bevel gear, that are engaged with the angled teeth on an adjacent bevel gear attached to a third door pulley 1202. A second pulley cable 1204 is coupled to third door pulley 1202 and a fourth door pulley 1206, which in turn is secured to a door slide connection member 1208 that extends from a first part 1208*a* aligned with fourth door pulley 1206 to a second part 1208*b* at a bottom portion of door 126. Therefore, when door 126 is opened via a rotational sliding motion, door slide connection member 1208 causes rotation of fourth door pulley 1206 and so on, thereby actuating all of the intervening gears and pulleys as described above to advance liner 702 when toilet seat 120 is not depressed.

In an alternative embodiment (not shown), first pulley cable 1104 and second pulley cable 1204 may be combined into a single cable with two vertical wheels to guide a pulley from a horizontal motion from the door to a vertical motion to connect the motion of the door to the gear train.

Additionally, and/or alternatively, a mechanical/electrical combination mechanism is contemplated for advancing liner 702, in which a laser may be positioned at the toilet seat. The laser may determine whether a user is present and/or standing or sitting. Upon detection of a user, particularly when sitting, a signal is sent to a controller to disengage the liner advancement mechanism. For example, toilet system 100 may further include an electronic circuit coupled with a motor configured to electronically trigger the advancement of the gears upon the door opening or upon receiving the signal, or by a user actuating a manual switch within toilet system 100. Such an electronic circuit and motor may be powered by a battery (rechargeable or otherwise) or an external power supply.

Further, note that the amount of advancement of liner 702 may be varied depending on whether a person is sitting or standing in toilet system 100 (i.e., urinating or defecating), which may be detected by placing a sensor in a predetermined location.

Additional Features and Advantages of a Toilet System

Other features or aspects of the toilet system 100, which may or may not be explicitly depicted, include, but are not limited to the following aspects.

The door may be attached to a lever under the floor and/or a lever in the top of the enclosure to actuate various devices such as: a fan system to vent the enclosure; a fragrance dispenser; a micro-generator to provide power to lights, sensors, lasers, electronic locks, fans, charging stations, automatic soap dispensers, etc. The actuation may be powered and motorized or may be simply mechanically initiated by the motion of the door. For example, upon opening the door, a lever is shifted and causes a fan to rotate temporarily until friction forces overcome the rotational motion. In addition to, and/or in place of, the lever, a one-way clutch may be connected to the bottom and/or top of the door. Thus, when the door is opened, the motion moves the clutch in one direction, and when the door closes, the clutch does not move.

The shape of toilet seat 120 may be circular, ovular, or another shape compatible with the advancing liner 702. It is contemplated that a circular seat may be the most compatible shape for advancing liner 702 as a circle has an equivalent arc radius at all points around the seat. Further, liner supply bin 908 may be positioned to supply liner 702 at the level of toilet seat 120 to minimize the amount of surface area and therefore friction, against which liner 702 is pulled across. Alternatively, liner supply bin 908 may deposited in a depression outside and slightly below the toilet seat 120 to minimize contact with the fresh liner 702.

Attached to liner spreader member 914 may be one or more containers 926 filled with urea, which may be in a liquid or a granular form. Deposition of urea in the waste begins the process of breaking down the waste material and inhibits the production of methane gas. The containers 926 may act as wheels with liner spreader member 914 that roll next to liner spreader member 914 as the liner 702 is pulled down. Upon rolling, the container(s) 926 releases urea from one or more openings in the container(s) 926. The container(s) 926 may connect to beveled gears that turn a urea spreader to release a predetermined amount of urea down into toilet bowl 906, which is covered with liner 702. Furthermore, the urea container(s) may be coated with a water-repelling agent, so that no liquid that splashes thereon will stick to the urea container(s) located under toilet seat 120.

In an alternative embodiment, instead of one or more containers with urea among liner spreader member 914, a small, aerosol-based urea dispenser 926 (for the sake of convenience since each embodiment of urea containers is located in a different place, the figure depicts a generic box 926, which represents all dispensers), filled with pressured liquid urea may be incorporated into the toilet area. A sensor may be connected to door 126, such that when door 126 is opened, a Bluetooth® or other wireless or wired actuated transmission is made to a receiver on the urea dispenser, and a squirt of pressurized urea and fragrance is sprayed into the bowl and on any waste. The urea dispenser may be a battery-operated motion sensor attached to the small aerosol can. Alternatively, when a person gets up, a squirt of pressurized urea and fragrance may be sprayed into the waste. In a further alternative embodiment, liquid urea may be dispensed when a person sits down, and the seat pushes on the container 926 and squirts a measured portion of the liquid urea into the waste. Moreover, the urea dispenser 926 may be a reservoir filled with liquid urea and a spray pump handle is activated by sitting down on toilet seat 120.

A counter 1210 may be attached to door 126 to record how many times door 126 has been opened. When the counter reaches a predetermined number that corresponds to either or both of the number of uses (i.e., length of liner 702) placed in liner supply bin 908 or a maximum capacity of waste storage bin 300, the counter may trigger door 126 to lock and prevent further use. Door 126 may still be opened from inside enclosure 104 in case a user is inside toilet system 100 when the counter reaches the locking number.

Additional smart technology features may include recording the date stamp of the time of use. This data can be transmitted through wireless technology to a central computer. A service technician may access real time data on the location of a toilet system and the number of uses for the unit and can judge how soon a unit needs to be serviced. The data collected can be given to the event/location provider to learn which units in what location are being used more than others. For example, for races such as 5 k, 10 k, half-marathons, and marathons, runners wear bibs with RFID chips. The toilet system may be equipped to read and log users wearing RFID chips. The providers will know who used which toilet and when and where. Such data can be useful to race organizers in planning toilet placement for races based on the age and sex of racers. In another example, toilet units may be locked to deter vandalism or destruction. As such, users may use an app on a phone, for example, or a fob, to unlock a toilet to use. Communication technology may be similar to what is used by realtors to unlock realtor lock boxes. In another example, at a military facility, soldiers using the toilet may be monitored via RFID, and a soldier using a toilet too many times in a day due to illness could be flagged for medical staff to assess the soldier since many soldiers are reticent to admit when sick.

Toilet systems may have a solar cell on top of the unit: to charge batteries for night lights inside the units, for USB charging ports on the outside of the unit for people to charge electronic devices, fan for when certain temperatures are reached or when the door opens to exhaust lingering smells. Alternatively, as indicated above, a battery recharging mechanism may be coupled to door 126, such that energy used to open the door is converted into electrical energy.

Toilet systems may be adapted for various purposes. For example, toilet system 100 may be scaled in size for children. In a system for children, a window may be added to enclosure 104 for a parent to view the child as needed. The window may have a cover to block the view from the inside if needed, as well. Additionally, and/or alternatively, in an embodiment, the toilet seat area may be adapted for users that prefer squatting positions rather than seated users. For example, some cultures encourage squatting over the seat, in which case, a seat may not be needed at all, and the liner may pass directly into the gears.

The inside of enclosure 104 may include features such as company and event advertisement racks for poster displays, brochures, electronic displays, or special shopping items, placed to be seen if a person is standing or sitting. In the event an electronic display screen is used, the display may be placed behind the door at sitting level and behind the toilet sitting area at standing level. Screens may show highlights of the location of the system and local events and/or upcoming shows. Users may be able to touch them to change the display, or the screens may be static and display advertisements based on the RFID information of the user (age/sex). Further, a hook or hangar may be attached within the enclosure to hang a purse or other personal item. Other compartments may be added to enclosure 104 to store toilet paper and or hand sanitizer in the event there is no room beneath basin cover 110.

Usability of a particular toilet system may be indicated by colored lights or flags. For example, a toilet system may include a flag on the unit that is raised when in service and lowered when full, or likewise, when in use or when vacant. Alternatively, another way to tell from a distance whether a system is available may include displaying red or green lights externally, depending on the state of use. Additionally, each toilet system may be GPS locatable via a tracking chip embedded therein. As such, an event organizer can direct users to systems known to be vacant when tracked with a signal indicating use status and location. Of course, there are many known reasons for locating an object with GPS. Notably, the GPS chip may be incorporated into a circuit via which a service provider may remotely lock and/or unlock a toilet system. In an embodiment, a noise may be played to indicate a system has been unlocked.

In an embodiment, enclosure 104 and/or waste storage basin 106 may be self-leveling to prevent tipping on uneven surfaces.

CONCLUSION

Although several embodiments have been described in language specific to structural features and/or methodological acts, it is to be understood that the claims are not necessarily limited to the specific features or acts described. Rather, the specific features and acts are disclosed as illustrative forms of implementing the claimed subject matter. Where the term "may" is used, it is intended that a feature might be incorporated or might not, and that such feature is not essential but potentially beneficial.

What is claimed is:

1. A toilet system, comprising:
   a waterless waste disposal subsystem including:
      a toilet seat, and
      a waste liner advancement mechanism configured to:
         cover the toilet seat with a liner,
         capture waste expelled from a user, and
         mechanically advance the liner into a waste storage area so as to place a fresh liner over the toilet seat after capturing the waste; and
   an enclosure around the toilet seat, the enclosure including a sliding door,
   wherein the liner includes an absorbent material disposed on at least a portion thereof to absorb fluid that contacts the liner.

2. The toilet system according to claim 1, wherein the enclosure forms a cylindrical privacy shield around the toilet seat.

3. The toilet system according to claim 2, wherein the enclosure is collapsible over the toilet seat into a collapsible state.

4. The toilet system according to claim 2, wherein the enclosure includes a plurality of coaxial wall sections, which in a usable state, are positionable such that each wall section is disposed at a different height to form the privacy shield.

5. The toilet system according to claim 2, wherein the enclosure includes a plurality of tiered wall sections, whereby the tiered wall sections are collapsible over the toilet seat.

6. The toilet system according to claim 1, wherein sliding the sliding door open actuates the waste liner advancement mechanism to advance the liner.

7. A toilet system, comprising:
   a toilet waste hole area;
   a door to enter into the toilet waste hole area; and
   a waste liner advancement mechanism configured to:
      cover the toilet waste hole area with a liner,
      capture waste expelled from a user, and
      mechanically advance the liner into a waste storage area beneath the toilet waste hole area so as to place a fresh liner over the toilet waste hole area after capturing the waste,
   wherein the toilet system is configured to transmit usage and status data for collection and analysis including a need to service the toilet system, and
   wherein the waste liner advancement mechanism is coupled with the door such that when the door is opened, the waste liner advancement mechanism is actuated to advance the liner.

8. The toilet system according to claim 7, further comprising a waste storage basin subsystem including a housing in which the waste storage area is maintained for storing the waste.

9. The toilet system according to claim 8, wherein the waste storage area includes a drawer that is configured to slidably be withdrawn from the housing, beneath the toilet waste hole area to clear out the waste.

10. The toilet system according to claim 8, wherein the waste storage basin subsystem further includes an access step that is concealable and storable within the housing.

11. The toilet system according to claim 8, wherein the housing includes a through hole in an upper surface thereof, via which the waste is advanced into the waste storage area.

12. The toilet system according to claim 8, wherein the waste storage area is removable through a side wall of the housing for service to clear out the waste.

13. The toilet system according to claim 8, wherein the housing is structured to support an enclosure that surrounds the toilet waste hole area.

14. The toilet system according to claim 7, wherein the need to service the toilet system is determined, at least in part, based on a number of counted uses of the toilet system.

15. The toilet system according to claim 7, wherein the toilet system is configured to wirelessly transmit usage and status data.

16. A toilet system, comprising:
a waste liner advancement mechanism configured to:
cover a toilet waste hole area with a liner,
capture waste expelled from a user, and
mechanically advance the liner into a waste storage area beneath the toilet waste hole area so as to place a fresh liner over the toilet waste hole area after capturing the waste; and
a door into the toilet system,
wherein the waste liner advancement mechanism is coupled with the door such that when the door is opened, the waste liner advancement mechanism is actuated to advance the liner.

17. The toilet system according to claim 16, wherein the waste liner advancement mechanism includes a pair of liner advancement gears disposed to engage the liner between interlocking gear teeth and rotatingly advance the liner into the waste storage area.

18. The toilet system according to claim 17, wherein the pair of liner advancement gears are formed of a rubberized foam material.

19. The toilet system according to claim 16, wherein the waste liner advancement mechanism is further configured to be disengaged from advancing the liner when a user is using the toilet waste hole area.

20. The toilet system according to claim 19, wherein the waste hole area includes a toilet seat, and
wherein, when the user sits on the toilet seat, and the door is opened, the liner will not advance.

* * * * *